United States Patent
Seok

(10) Patent No.: US 10,542,526 B2
(45) Date of Patent: Jan. 21, 2020

(54) METHOD AND APPARATUS FOR PROCESSING PPDU BASED ON BSS IDENTIFICATION INFORMATION IN A HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Lake Forest, CA (US)

(*) Notice: Subject to any disclaimer, the term of this patent is extended or adjusted under 35 U.S.C. 154(b) by 0 days.

(21) Appl. No.: 15/600,586

(22) Filed: May 19, 2017

(65) Prior Publication Data

US 2017/0289987 A1    Oct. 5, 2017

Related U.S. Application Data

(63) Continuation of application No. PCT/IB2015/002169, filed on Nov. 18, 2015.
(Continued)

(51) Int. Cl.
*H04W 4/00* (2018.01)
*H04W 72/04* (2009.01)
(Continued)

(52) U.S. Cl.
CPC ....... *H04W 72/0406* (2013.01); *H04W 74/00* (2013.01); *H04W 74/08* (2013.01); *H04W 74/0816* (2013.01); *H04W 84/12* (2013.01)

(58) Field of Classification Search
None
See application file for complete search history.

(56) References Cited

U.S. PATENT DOCUMENTS

2013/0201974 A1    8/2013 Merlin et al.
2014/0112266 A1*   4/2014 Seok .................. H04W 74/04
                                                  370/329
(Continued)

FOREIGN PATENT DOCUMENTS

AU    2013217790 B2    8/2013
EP       3185637 A1    6/2017
(Continued)

OTHER PUBLICATIONS

International Search Report for International Patent Application No. PCT/IB2015/002169, filed Nov. 18, 2015.
(Continued)

*Primary Examiner* — Bob A Phunkulh

(57) ABSTRACT

Methods and apparatus for processing Physical layer Protocol Data Unit (PPDU) based on Basic Service Set (BSS) identification information in a High Efficiency WLAN (HEW) are described. An embodiment is a method for processing a PPDU by a station (STA) in a wireless local area network. The method may include determining whether the PPDU is transmitted from a different Basic Service Set (BSS) from a BSS to which the STA belongs or a same BSS as the BSS to which the STA belongs; and processing the PPDU using a first type of Clear Channel Assessment (CCA) threshold when the PPDU is determined to be transmitted from the different BSS, wherein the first type of CCA threshold is greater than a second type of CCA threshold which is used when the PPDU is determined to be transmitted from the same BSS.

18 Claims, 29 Drawing Sheets

Related U.S. Application Data

(60) Provisional application No. 62/081,910, filed on Nov. 19, 2014, provisional application No. 62/086,516, filed on Dec. 2, 2014, provisional application No. 62/087,653, filed on Dec. 4, 2014, provisional application No. 62/092,138, filed on Dec. 15, 2014, provisional application No. 62/098,923, filed on Dec. 31, 2014, provisional application No. 62/181,142, filed on Jun. 17, 2015.

(51) Int. Cl.
*H04W 74/00* (2009.01)
*H04W 74/08* (2009.01)
*H04W 84/12* (2009.01)

(56) References Cited

U.S. PATENT DOCUMENTS

| | | | | |
|---|---|---|---|---|
| 2014/0119303 A1* | 5/2014 | Kwon | ............... | H04W 76/10 370/329 |
| 2014/0293905 A1 | 10/2014 | Tian et al. | | |
| 2014/0328270 A1 | 11/2014 | Zhu et al. | | |
| 2015/0124744 A1* | 5/2015 | Zhu | ............... | H04W 72/1257 370/329 |
| 2015/0319700 A1* | 11/2015 | Oteri | ............... | H04W 52/28 455/127.1 |
| 2016/0007379 A1* | 1/2016 | Seok | ............... | H04W 74/085 370/338 |
| 2016/0066349 A1* | 3/2016 | Seok | ............... | H04W 24/02 370/338 |
| 2016/0081010 A1* | 3/2016 | Seok | ............... | H04W 74/0816 370/329 |
| 2017/0079067 A1* | 3/2017 | Li | ............... | H04W 24/02 |

FOREIGN PATENT DOCUMENTS

| | | |
|---|---|---|
| WO | WO 2013/119095 A1 | 8/2013 |
| WO | WO 2014/061978 A1 | 4/2014 |
| WO | 2014071308 A1 | 5/2014 |
| WO | 2014178502 A1 | 6/2014 |

OTHER PUBLICATIONS

"Part 11: Wireless LAN Medium Access Control (MAC) and Physical Layer (PHY) Specifications", IEEE Standards 802.11™-2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™-2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

Extended European Search Report for Patent Application No. 15866341.9, dated Aug. 2, 2018.

* cited by examiner

FIG. 11

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3, STA4) |
| | | | | HE-STF | HE-LTF | HE-LTF | HE-LTF | HE-LTF | HE-SIG-B | PSDU(AP to STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-SIG-C | PSDU(AP to STA1, STA2) |

| Frame Control | Duration/ID | Address 1 | Carried Frame Control | HT Control | Carried Frame | FCS |
|---|---|---|---|---|---|---|
| 2 | 2 | 6 | 2 | 4 | variable | 4 |

Octets:

METHOD AND APPARATUS FOR PROCESSING PPDU BASED ON BSS IDENTIFICATION INFORMATION IN A HIGH EFFICIENCY WIRELESS LAN

CROSS-REFERENCE TO RELATED APPLICATIONS

This application is a bypass continuation of International Patent Application No. PCT/IB2015/002169, filed on Nov. 18, 2015, which claims the benefits of U.S. Provisional Application No. 62/081,910, filed on Nov. 19, 2014, U.S. Provisional Application No. 62/086,516, filed on Dec. 2, 2014, U.S. Provisional Application No. 62/087,653, filed on Dec. 4, 2014, U.S. Provisional Application No. 62/092,138, filed on Dec. 15, 2014, U.S. Provisional Application No. 62/098,823, filed on Dec. 31, 2014, and U.S. Provisional Application No. 62/181,142, filed on Jun. 17, 2015, which are hereby incorporated by reference as if fully set forth herein.

BACKGROUND

Technical Field

The present disclosure relates to a Wireless Local Area Network (WLAN), and more particularly, to a method, apparatus, and software for processing Physical layer Protocol Data Unit (PPDU) based on Basic Service Set (BSS) identification information in a High Efficiency WLAN (HEW), and a recording medium that stores the software.

Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

No specified method for processing Protocol Data Unit (PPDU) based on Basic Service Set (BSS) identification in High Efficiency WLAN (HEW) is provided.

SUMMARY

Objects of the present disclosure are to provide a method and apparatus for processing PPDU based on BSS identification information in a HEW.

The objects of the present disclosure are not limited to the foregoing descriptions, and additional objects will become apparent to those having ordinary skill in the pertinent art to the present disclosure based upon the following descriptions.

In an aspect of the present disclosure, a method for processing a Physical layer Protocol Data Unit (PPDU) by a station (STA) in a wireless local area network may be provided. The method may include determining whether the PPDU is transmitted from a different Basic Service Set (BSS) from a BSS to which the STA belongs or a same BSS as the BSS to which the STA belongs; and processing the PPDU using a first type of Clear Channel Assessment (CCA) threshold when the PPDU is determined to be transmitted from the different BSS, wherein the first type of CCA threshold is greater than a second type of CCA threshold which is used when the PPDU is determined to be transmitted from the same BSS.

In another aspect of the present disclosure, a method for processing a Physical layer Protocol Data Unit (PPDU) by a station (STA) in a wireless local area network may be provided. The method may include determining whether the PPDU is transmitted from a different Basic Service Set (BSS) from a BSS to which the STA belongs or a same BSS as the BSS to which the STA belongs; and determining whether to update a Network Allocation Vector (NAV) based on whether the PPDU is transmitted from the different BSS or the same BSS.

In an aspect of the present disclosure, a method for accessing a channel by a station (STA) in a wireless local area network may be provided. The method may include determining whether a Physical layer Protocol Data Unit (PPDU) is transmitted from a different Basic Service Set (BSS) from a BSS to which the STA belongs or a same BSS as the BSS to which the STA belongs; determining whether the channel is idle for a predetermined Inter-Frame Space (IFS) using a first type of Clear Channel Assessment (CCA) threshold when the PPDU is determined to be transmitted from the different BSS; and performing a channel access procedure when the channel is determined to be idle for the predetermined IFS, wherein the first type of CCA threshold is greater than a second type of CCA threshold which is used when the PPDU is determined to be transmitted from the same BSS.

In an aspect of the present disclosure, a method for processing a Physical layer Protocol Data Unit (PPDU) by a station (STA) in a wireless local area network may be provided. The method may include detecting the PPDU; determining whether the detected PPDU is transmitted from a different Basic Service Set (BSS) from a BSS to which the STA belongs or a same BSS as the BSS to which the STA belongs; and determining whether to reset a Network Allocation Vector (NAV) based on whether the detected PPDU is transmitted from the different BSS or the same BSS.

In another aspect of the present disclosure, a STA apparatus for processing a Physical layer Protocol Data Unit (PPDU) in a wireless local area network may be provided. The STA apparatus may include a baseband processor, a Radio Frequency (RF) transceiver, a memory, etc. The baseband processor may be configured to determine whether the PPDU is transmitted from a different Basic Service Set (BSS) from a BSS to which the STA belongs or a same BSS as the BSS to which the STA belongs; and process the PPDU using a first type of Clear Channel Assessment (CCA) threshold when the PPDU is determined to be transmitted from the different BSS, wherein the first type of CCA threshold is greater than a second type of CCA threshold which is used when the PPDU is determined to be transmitted from the same BSS.

In another aspect of the present disclosure, a STA apparatus for processing a Physical layer Protocol Data Unit (PPDU) in a wireless local area network may be provided. The STA apparatus may include a baseband processor, a Radio Frequency (RF) transceiver, a memory, etc. The baseband processor may be configured to determine whether the PPDU is transmitted from a different Basic Service Set (BSS) from a BSS to which the STA belongs or a same BSS as the BSS to which the STA belongs; and determine whether to update a Network Allocation Vector (NAV) based on whether the PPDU is transmitted from the different BSS or the same BSS.

In another aspect of the present disclosure, a STA apparatus for accessing a channel in a wireless local area network may be provided. The STA apparatus may include a baseband processor, a Radio Frequency (RF) transceiver, a memory, etc. The baseband processor may be configured to determine whether a Physical layer Protocol Data Unit (PPDU) is transmitted from a different Basic Service Set (BSS) from a BSS to which the STA belongs or a same BSS as the BSS to which the STA belongs; determine whether the channel is idle for a predetermined Inter-Frame Space (IFS) using a first type of Clear Channel Assessment (CCA) threshold when the PPDU is determined to be transmitted from the different BSS; and perform a channel access procedure when the channel is determined to be idle for the predetermined IFS, wherein the first type of CCA threshold is greater than a second type of CCA threshold which is used when the PPDU is determined to be transmitted from the same BSS.

In another aspect of the present disclosure, a STA apparatus for processing a Physical layer Protocol Data Unit (PPDU) in a wireless local area network may be provided. The STA apparatus may include a baseband processor, a Radio Frequency (RF) transceiver, a memory, etc. The baseband processor may be configured to detect the PPDU; determine whether the detected PPDU is transmitted from a different Basic Service Set (BSS) from a BSS to which the STA belongs or a same BSS as the BSS to which the STA belongs; and determine whether to reset a Network Allocation Vector (NAV) based on whether the detected PPDU is transmitted from the different BSS or the same BSS.

In another aspect of the present disclosure, a software or computer-readable medium having instructions executable for an STA to process a Physical layer Protocol Data Unit (PPDU) by a station (STA) in a wireless local area network may be provided. The executable instructions may cause the STA to determine whether the PPDU is transmitted from a different Basic Service Set (BSS) from a BSS to which the STA belongs or a same BSS as the BSS to which the STA belongs; and process the PPDU using a first type of Clear Channel Assessment (CCA) threshold when the PPDU is determined to be transmitted from the different BSS, wherein the first type of CCA threshold is greater than a second type of CCA threshold which is used when the PPDU is determined to be transmitted from the same BSS.

In another aspect of the present disclosure, a software or computer-readable medium having instructions executable for an STA to process a Physical layer Protocol Data Unit (PPDU) in a wireless local area network may be provided. The executable instructions may cause the STA to determine whether the PPDU is transmitted from a different Basic Service Set (BSS) from a BSS to which the STA belongs or a same BSS as the BSS to which the STA belongs; and determine whether to update a Network Allocation Vector (NAV) based on whether the PPDU is transmitted from the different BSS or the same BSS.

In another aspect of the present disclosure, a software or computer-readable medium having instructions executable for an STA to access a channel in a wireless local area network may be provided. The executable instructions may cause the STA to determine whether a Physical layer Protocol Data Unit (PPDU) is transmitted from a different Basic Service Set (BSS) from a BSS to which the STA belongs or a same BSS as the BSS to which the STA belongs; determine whether the channel is idle for a predetermined Inter-Frame Space (IFS) using a first type of Clear Channel Assessment (CCA) threshold when the PPDU is determined to be transmitted from the different BSS; and perform a channel access procedure when the channel is determined to be idle for the predetermined IFS, wherein the first type of CCA threshold is greater than a second type of CCA threshold which is used when the PPDU is determined to be transmitted from the same BSS.

In another aspect of the present disclosure, a software or computer-readable medium having instructions executable for an STA to process a Physical layer Protocol Data Unit (PPDU) in a wireless local area network may be provided. The executable instructions may cause the STA to detect the PPDU; determine whether the detected PPDU is transmitted from a different Basic Service Set (BSS) from a BSS to which the STA belongs or a same BSS as the BSS to which the STA belongs; and determine whether to reset a Network Allocation Vector (NAV) based on whether the detected PPDU is transmitted from the different BSS or the same BSS.

It is to be understood that both the foregoing summarized features are exemplary aspects of the following detailed description of the present disclosure without limiting the scope of the present disclosure.

According to the present disclosure, a method and apparatus for processing PPDU based on BSS identification information in a HEW can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of a High Efficiency Long Training Field (HE-LTF) field in a HE PPDU frame format according to the present disclosure;

FIG. 12 depicts a High Efficiency SIGnal B (HE-SIG-B) field and a High Efficiency SIGnal C (HE-SIG-C) field in the HE PPDU frame format according to the present disclosure;

FIG. 13 depicts another example of a HE PPDU frame format according to the present disclosure;

FIG. 23 depicts a Control Wrapper frame including BSS identification information according to the present disclosure;

DETAILED DESCRIPTION

Figure 1:
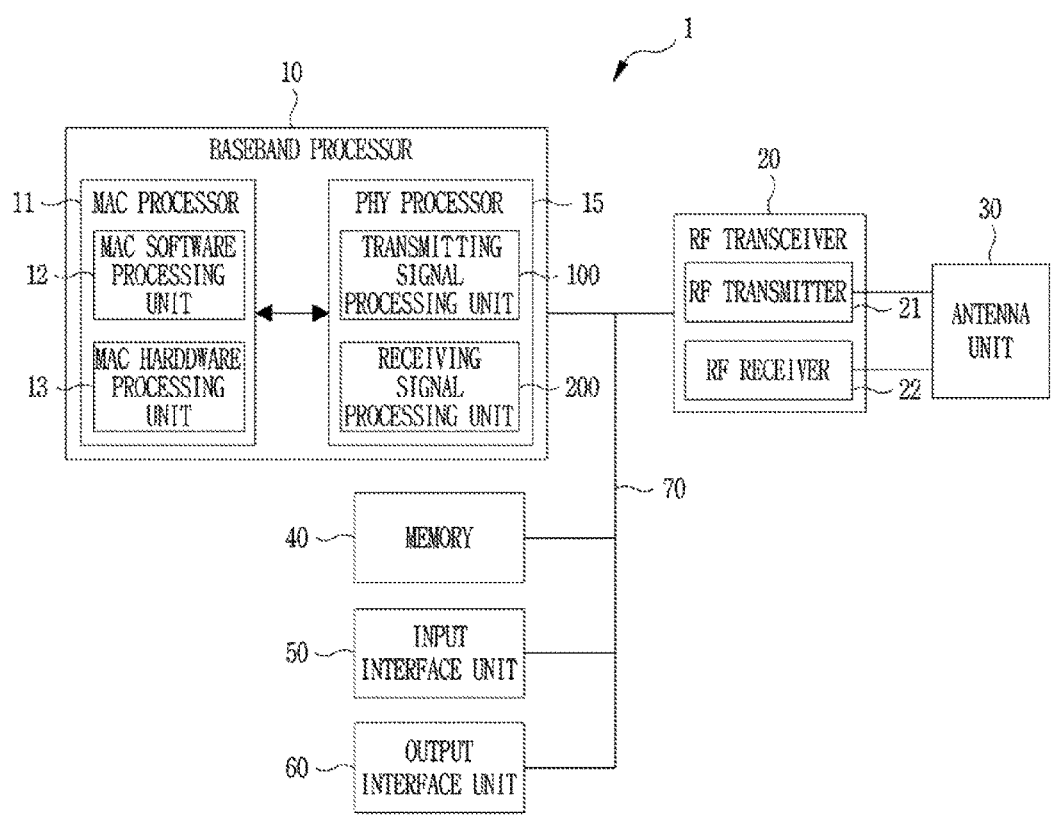
FIG. 1 is a block diagram of a Wireless Local Area Network (WLAN) device.

In the following detailed description, certain embodiments of the present disclosure have been shown and described, by way of illustration. As those skilled in the art would realize, the described embodiments may be modified in various different ways, without departing from the spirit or scope of the present disclosure. Accordingly, the drawings and description are to be regarded as illustrative in nature and not restrictive. Like reference numerals designate like elements throughout the present disclosure.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as an STA or may be collectively referred to as STAs. However, for ease of description herein, only the non-AP STAs may be referred to herein as STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, which may be or may include a non-transitory computer-readable medium, an input interface unit 50, an output interface unit 60, and a bus 70.

The baseband processor 10 may be simply referred to as a processor, and may perform baseband signal processing described in the present disclosure, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, embodiments of the MAC processor 11 are not limited to this distribution of functionality.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple Input Multiple Output (MIMO) or Multi-User MIMO (MU-MIMO) is used, the antenna unit 30 may include a plurality of antennas.

Figure 2:
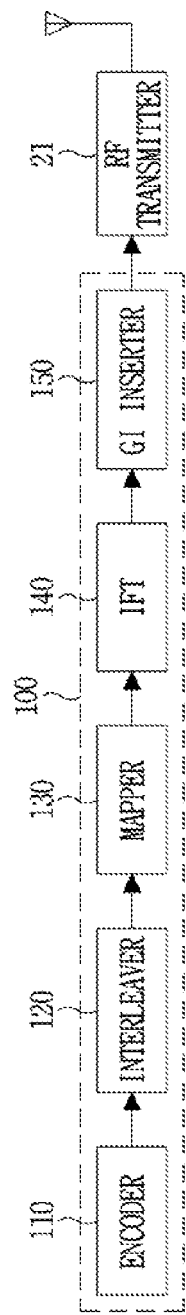
FIG. 2 is a schematic block diagram of an exemplary transmitting signal processing unit in a WLAN.

FIG. 2 is a schematic block diagram of an exemplary transmitting signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 100 may be a Transmit Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
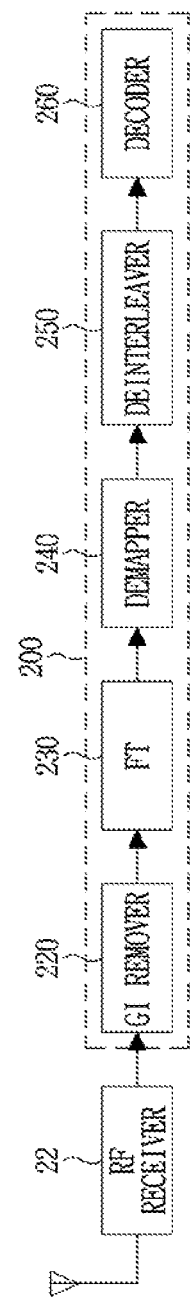
FIG. 3 is a schematic block diagram of an exemplary receiving signal processing unit in a WLAN.

FIG. 3 is a schematic block diagram of an exemplary receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into one or more symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may use/include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, or colloquially as a 'listen before talk' access mechanism. According to the CSMA/CA mechanism, an AP and/or an STA may sense a medium or a channel for a predetermined time before starting transmission, that is, the AP and/or the STA may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
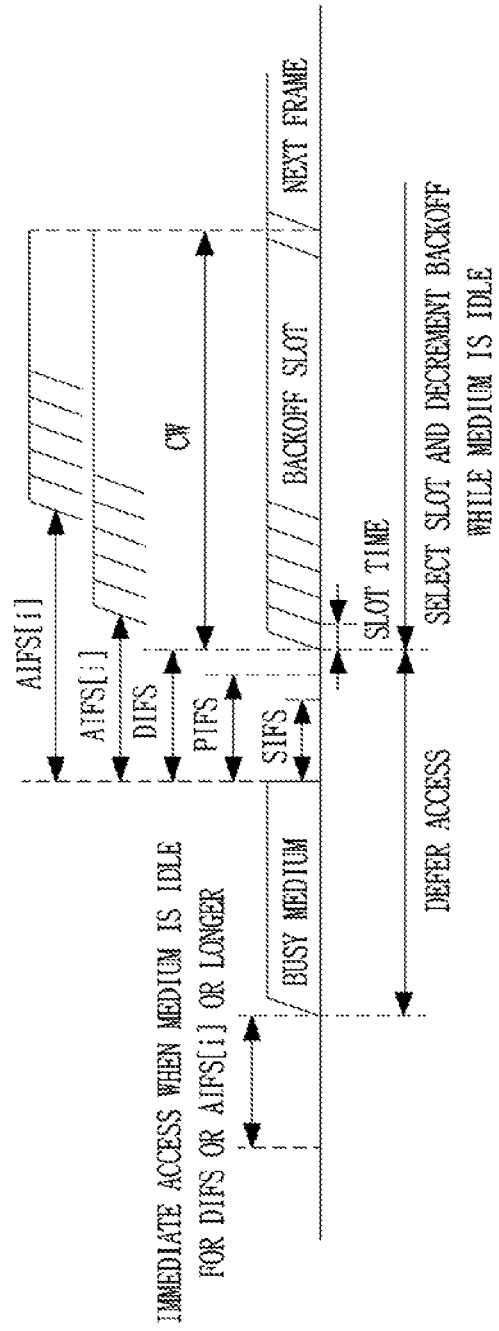
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data transmitted to a higher layer. The WLAN device transmits the data frame after performing backoff if a Distributed Coordination Function IFS (DIFS) has elapsed from a time when the medium has been idle. A management frame is used for exchanging management information which is not transmited to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to a previous frame, the WLAN device transmits the control frame after performing backoff if the DIFS has elapsed. In case that the control frame is a response frame to a previous frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, an STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium is idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempts transmission. The random backoff count is determined based on a Contention Window (CW) parameter and the medium is monitored continuously during countdown of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
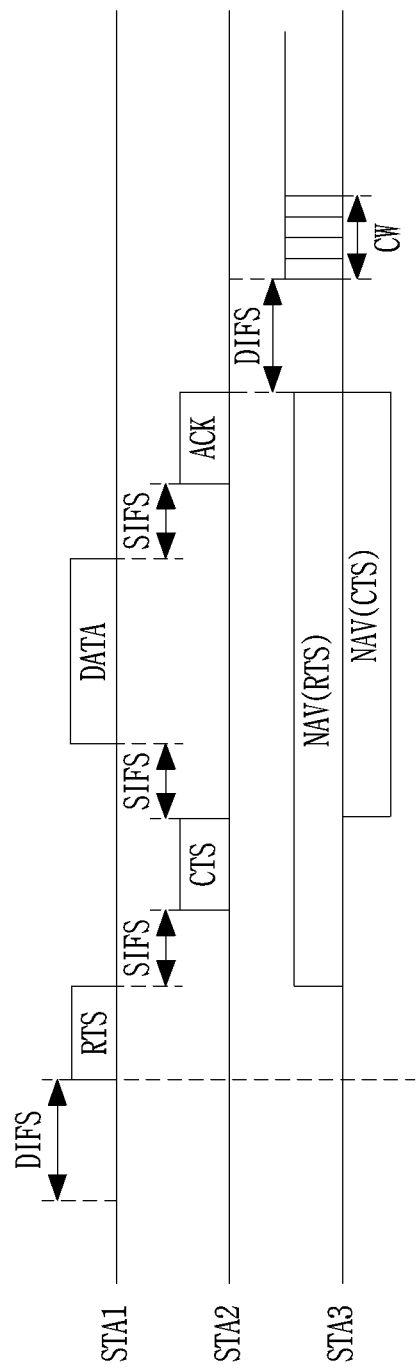
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
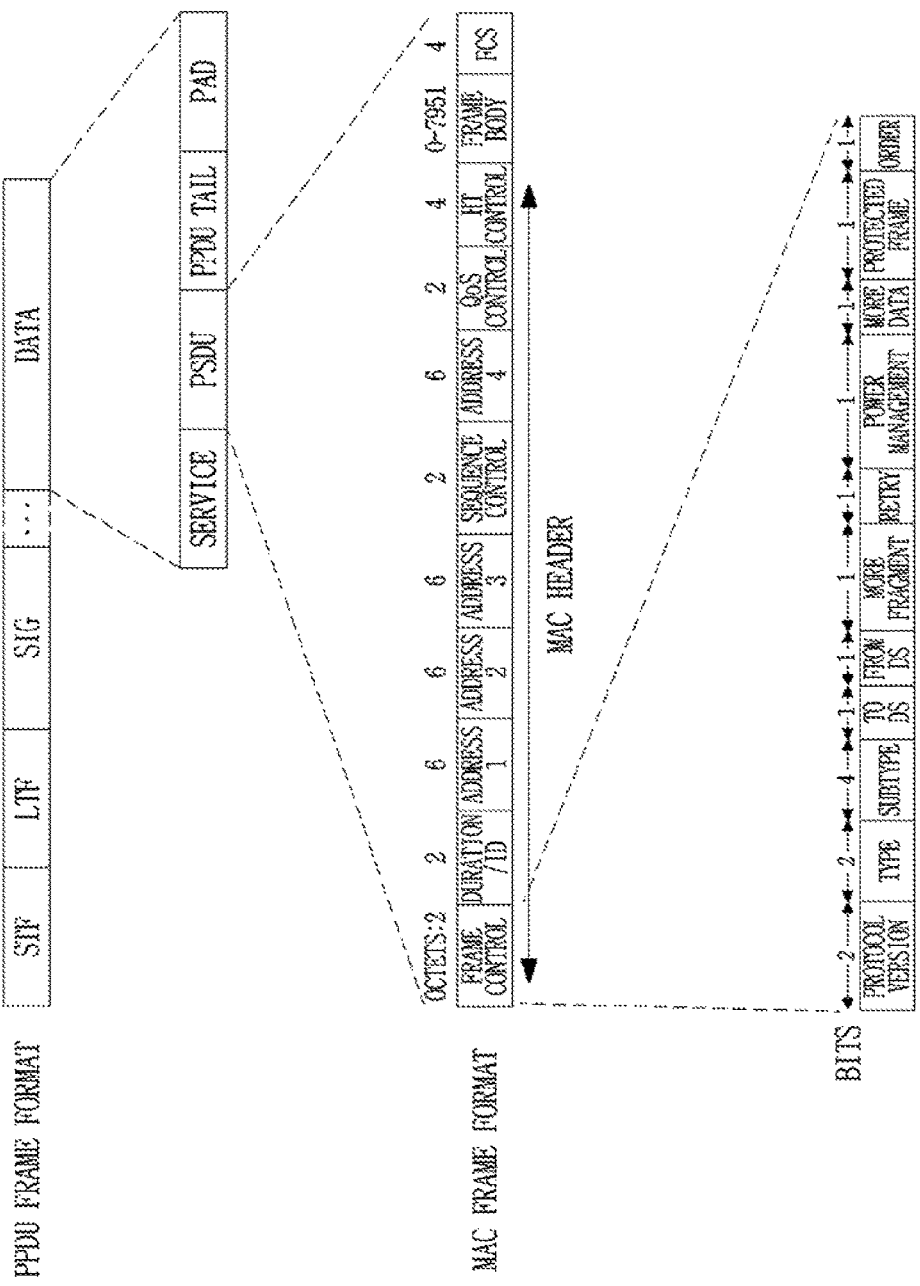
FIG. 6 depicts an exemplary frame structure in a WLAN system.

FIG. 6 depicts an exemplary frame structure in a WLAN system.

PHY layer may prepare for transmission of a MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. Some of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification, which is hereby incorporated by reference.

The Frame Control field of the MAC header may include Protocol Version, Type, Subtype, To Distribution System (DS), From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present disclosure, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
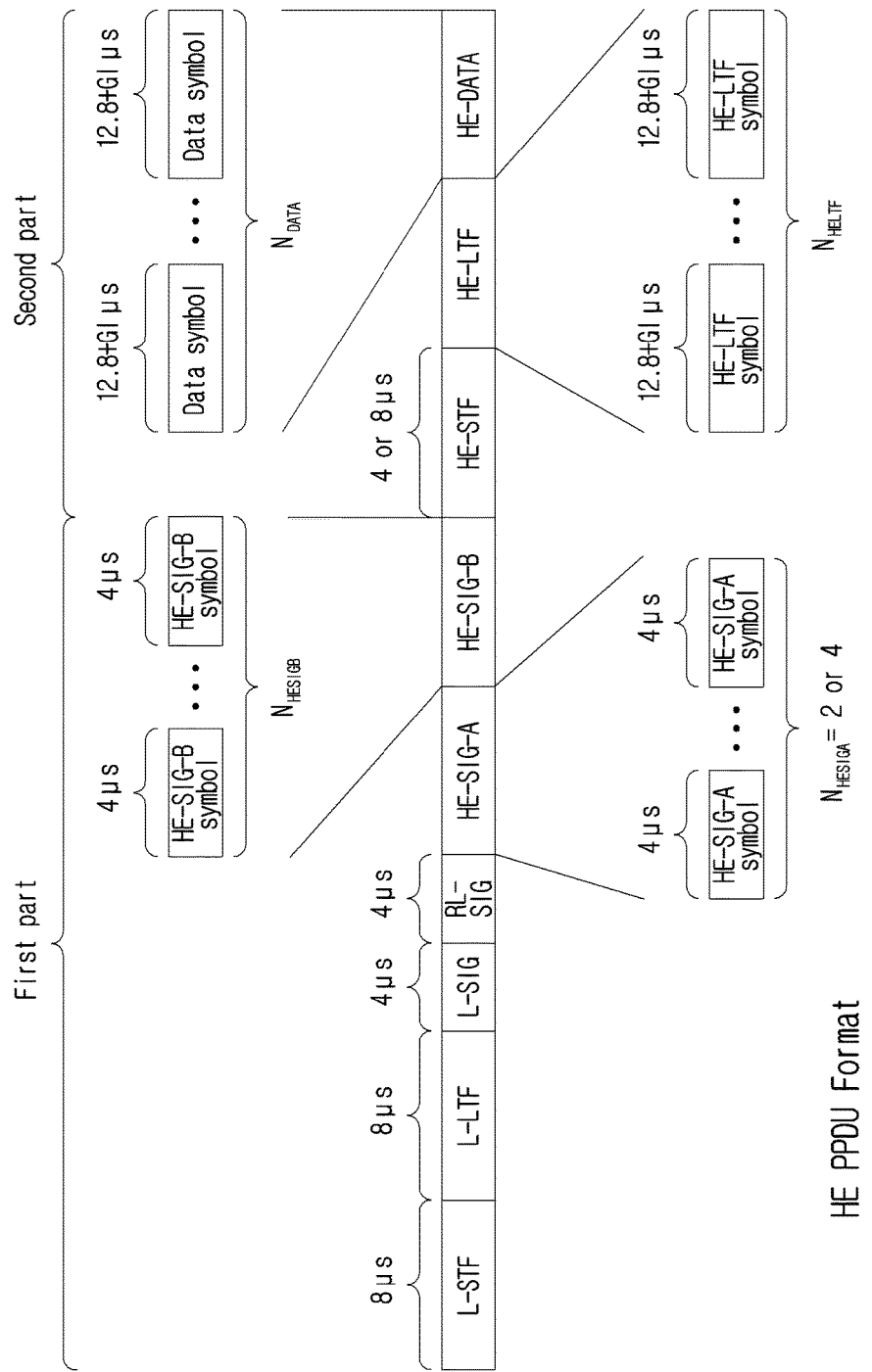
FIG. 7 depicts an exemplary HE PPDU frame format.

FIG. 7 depicts an exemplary HE PPDU frame format.

A transmitting STA may generate a PPDU frame according to the HE PPDU frame format as illustrated in FIG. 7 and transmit the PPDU frame to a receiving STA. The receiving STA may receive, detect, and process the PPDU.

The HE PPDU frame format may broadly include two parts: the first part including an L-STF field, an L-LTF field, an L-SIG field, a Repeated L-SIG (RL-SIG) field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table I.

TABLE I

| Element | definition | duration | DFT period | GI | Subcarrier spacing | Description |
| --- | --- | --- | --- | --- | --- | --- |
| Legacy(L)-STF | Non-high throughput (HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |
| RL-SIG | Repeated Non-HT SIGNAL field | 4 μs | 3.2 μs | 0.8 μs | 312.5 kHz | |
| HE-SIG-A | HE SIGNAL A field | $N_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |

TABLE I-continued

| Element | definition | duration | DFT period | GI | Subcarrier spacing | Description |
|---|---|---|---|---|---|---|
| HE-SIG-B | HE SIGNAL B field | $N_{HESIGB}*4$ μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-LTF | HE Long Training field | $N_{HELTF}*$ (DFT period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}*$ (DFT period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

L-STF, L-LTF, L-SIG, and RL-SIG may be called legacy preambles.

HE-SIG-A is a HE SIGNAL A field and may have a duration of $N_{HESIGA}*4$ μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE SIGNAL B field and may have a duration of $N_{HESIGB}*4$ μs, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is a HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of $N_{HELTF}*$(DFT period+GI)μs. $N_{HELTF}$ represents the number of HE-LTF symbols and may have a value of 1, 2, 4, 6, or 8. A HE PPDU may support a 2xLTF mode and a 4xLTF mode. In the 2xLTF mode, a HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4xLTF mode, a HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2xLTF may have a DFT period of 6.4 μs and 4xLTF may have a DFT period of 12.8 μs. A GI of HE-LTF may support 0.8 μs, 1.6 μs, and 3.2 μs. 2xLTF may have a subcarrier spacing equivalent to 156.25 kHz and 4xLTF may have a subcarrier spacing of 78.125 kHz.

HE-DATA is a HE DATA field and may have a duration of, $N_{DATA}$*(DFT period+GI)/μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
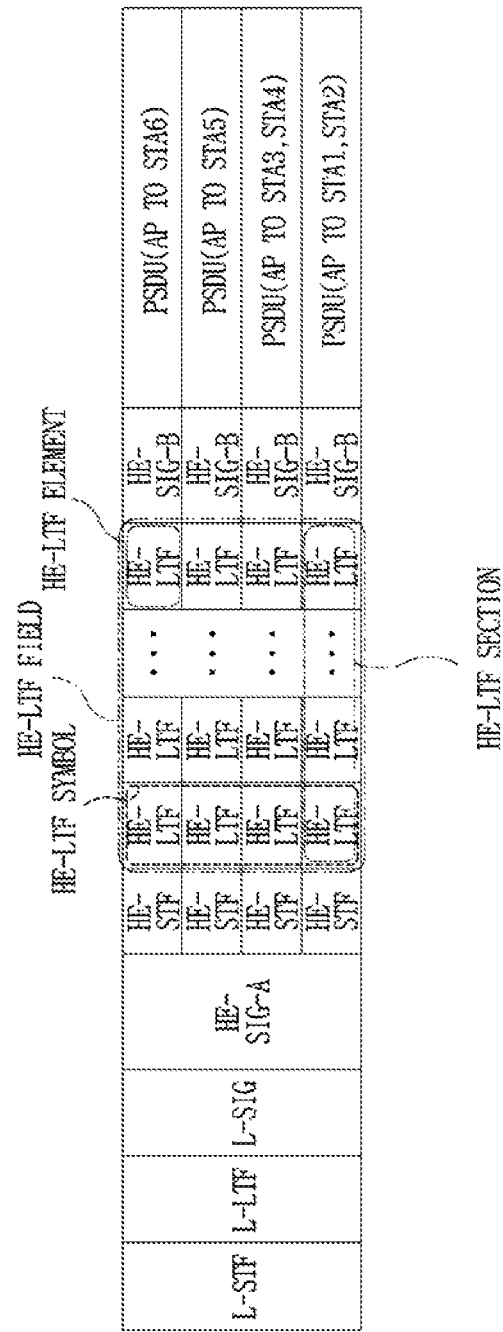
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and a HE-SIG-A may be transmitted per channel (e.g., 20 MHz). A HE-STF and a HE-LTF may be transmitted on each basic subchannel unit (e.g., 5 MHz)), and a HE-SIG-B and a PSDU may be transmitted on each of the subchannels allocated to an STA. A subchannel allocated to an STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STAG.

While the term subchannel is used in the present disclosure, the term subchannel may also be referred to as Resource Unit (RU) or subband. In particular, terms like OFDMA subchannel, OFDMA RU, OFDMA subband can be used as synonyms for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to an STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to an STA) in frequency domain. The HE-LTF elements are logical units, and the PHY layer does not necessarily operate in units of a HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to an STA) in frequency domain.

A HE-LTF field may be a set of HE-LTF elements, HE-LTF symbols, or HE-LTF sections for a plurality of STAs.

The L-STF field is used for frequency offset estimation and phase offset estimation, for preamble decoding at a legacy STA (i.e., an STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The set of parameters included in the HEW SIG-A field may include one or more of Very High Throughput (VHT) PPDU modulation parameters transmitted by IEEE 802.11ac stations, as listed in Table II below, to ensure backward compatibility with legacy STAs (e.g., IEEE 802.11ac stations).

TABLE II

| Two parts of VHT-SIG-A | Bit | Field | Number of bits | Description |
| --- | --- | --- | --- | --- |
| VHT-SIG-A1 | B0-B1 | BW | 2 | Set to 0 for 20 MHz, 1 for 40 MHz, 2 for 80 MHz, and 3 for 160 MHz and 80 + 80 MHz |
|  | B2 | Reserved | 1 | Reserved. Set to 1. |
|  | B3 | STBC | 1 | For a VHT SU PPDU: Set to 1 if space time block coding is used and set to 0 otherwise. For a VHT MU PPDU: Set to 0. |
|  | B4-B9 | Group ID | 6 | Set to the value of the TXVECTOR parameter GROUP_ID. A value of 0 or 63 indicates a VHT SU PPDU; otherwise, indicates a VHT MU PPDU. |
|  | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes |

TABLE II-continued

| Two parts of VHT-SIG-A | Bit | Field | Number of bits | Description |
|---|---|---|---|---|
| | | | | the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE—If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

Table II illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification, which is hereby incorporated by reference. In the HE PPDU frame format of the present disclosure, the HE-SIG-A field may include one or more of the fields included in the VHT-SIG-A field, and it may provide backward compatibility with IEEE 802.11ac stations.

Figure 9:
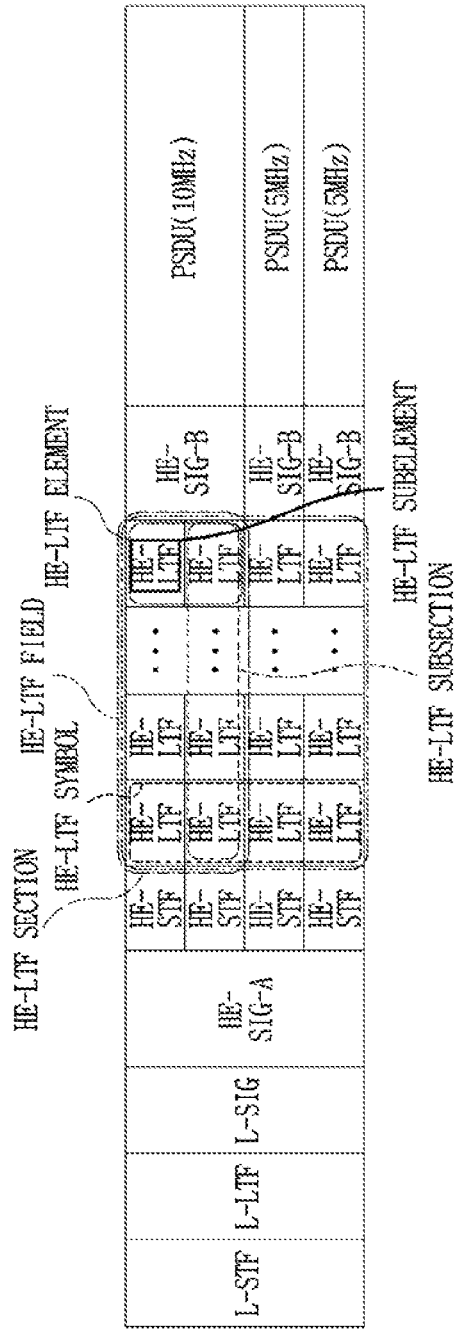
FIG. 9 depicts subchannel allocation in a HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and a HE-SIG-A may be transmitted per channel (e.g., 20 MHz), a HE-STF and a HE-LTF may be transmitted on each basic subchannel unit (e.g., 5 MHz), and a HE-SIG-B and a PSDU may be transmitted on each of the subchannels allocated to STAs. A subchannel allocated to an STA has a size required for PSDU transmission to the STA. The size of the subchannel allocated to the STA may be an N (N=1, 2, 3, ...) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice the size of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to an STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel (i.e., 10-MHz subchannel, allocated to STA4). A HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to an STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to an STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel (i.e., 10-MHz subchannel, allocated to STA4).

A HE-LTF field may correspond to a set of HE-LTF elements (or subelements), HE-LTF symbols, or HE-LTF sections (or subsections) for a plurality of STAs.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to an STA.

Figure 10:
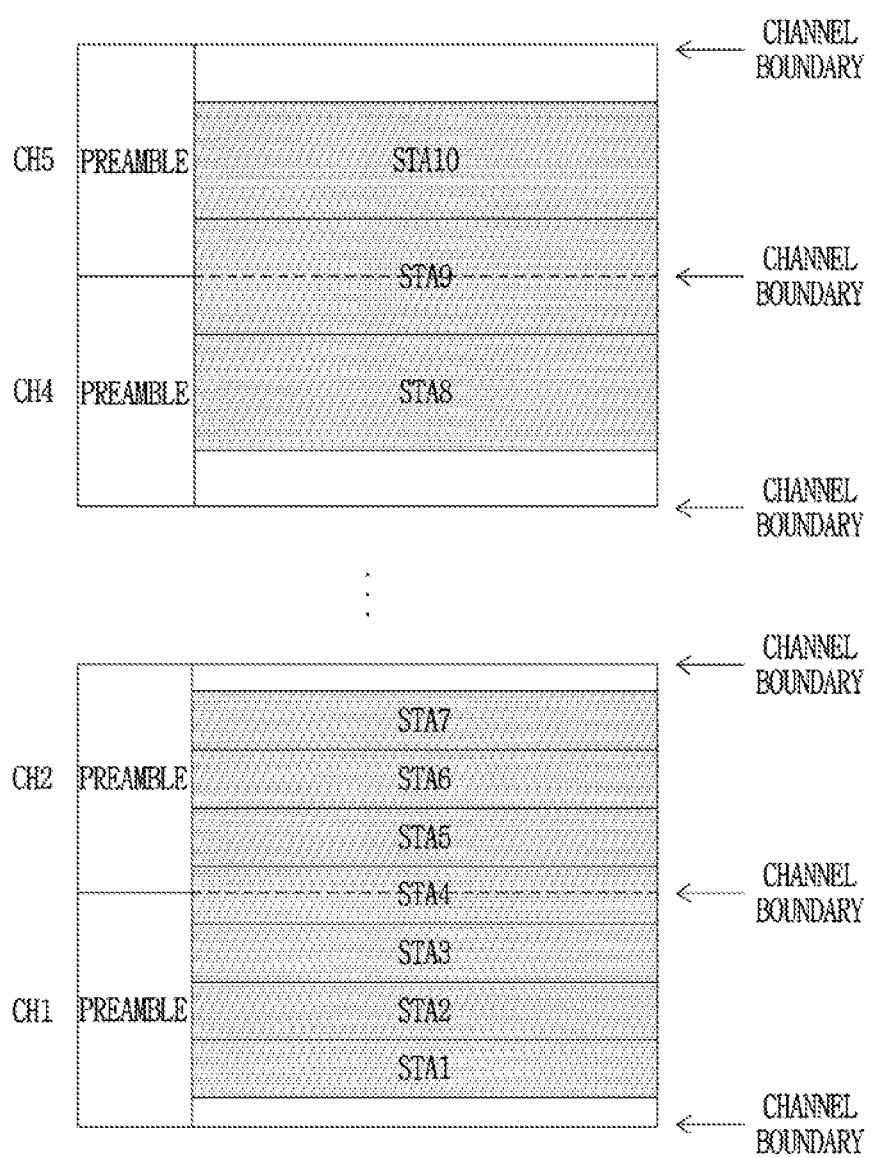
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels, each having double the size (e.g., 10 MHz) of the basic subchannel unit in CH4 and CH5, are allocated to STA8, STA9, and STA10.

As illustrated in the lower part of FIG. 10, although a subchannel allocated to STA1, STA2, STA3, STA5, STAG, or STA7 is fully overlapped only with one channel (i.e., without crossing the channel boundary, or belonging only to one channel), a subchannel allocated to STA4 is partially overlapped with the two channels (i.e., crossing the channel boundary, or belonging to two channels). In the foregoing example of the present disclosure, the subchannel allocation to STA4 is not allowed.

As illustrated in the upper part of FIG. 10, although a subchannel allocated to STA8 or STA10 is fully overlapped only with one channel (i.e., without crossing the channel boundary, or belonging only to one channel), a subchannel allocated to STA9 is partially overlapped with two channels (i.e., crossing the channel boundary, or belonging to two channels). In the foregoing example of the present disclosure, the subchannel allocation to STA9 is not allowed.

On the other hand, in some embodiments, it may be allowed to allocate a subchannel partially overlapped between a plurality of channels (i.e., crossing the channel boundary, or belonging to two channels). For example, in SU-MIMO mode transmission, a plurality of contiguous channels may be allocated to an STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to a HE STA allocated to each sub channel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in additional detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are transmitted to support MU-MIMO transmission.

According to an example of the present disclosure, the relationship between a total number of spatial streams transmitted on one subchannel and a number of HE-LTFs is listed in Table III.

TABLE III

| Total number of spatial streams transmitted on one subchannel | Number of HE-LTFs |
| --- | --- |
| 1 | 1 |
| 2 | 2 |
| 3 | 4 |

TABLE III-continued

| Total number of spatial streams transmitted on one subchannel | Number of HE-LTFs |
| --- | --- |
| 4 | 4 |
| 5 | 6 |
| 6 | 6 |
| 7 | 8 |
| 8 | 8 |

Referring to Table III as an example, if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number that is 1 larger than the number of the spatial streams need to be transmitted.

Referring to FIG. 11 again, it is assumed that the second 5-MHz subchannel is allocated to STA3 and STA4 and one spatial stream per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for the purpose of setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby disrupting orthogonality (i.e., orthogonality is not maintained). To overcome this problem, an additional constraint needs to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the number of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the number of HE-LTFs (HE-LTF symbols or HE-LTF elements in a HE-LTF section) required according to the total number of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to Table III). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for an STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (where P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e., P) of another subchannel. Also, the number of HE-LTF elements (i.e., P) included in a HE-LTF section in one of the Q subchannels may be equal to the number of HE-LTF elements (i.e., P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or STAs).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STAG on the fourth subchannel may be said to be placeholders that are not actually used for channel estimation at the STAs.

FIG. 12 depicts a HE-SIG-B field and a HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including Modulation and Coding Scheme (MCS) information about a PSDU and information about the length of the PSDU, etc.

With reference to the foregoing examples of the present disclosure, mainly the features of a HE PPDU frame structure applicable to a DL MU-MIMO-mode or OFDMA-mode transmission that an AP transmits simultaneously to a plurality of STAs has been described. Now, a description will be given of the features of a HE PPDU frame structure applicable to a UL MU-MIMO-mode or OFDMA-mode transmission that a plurality of STAs transmit simultaneously to an AP.

The above-described various examples of structures of the HE PPDU frame format supporting MU-MIMO-mode or OFDMA-mode transmission should not be understood as applicable only to DL without being applicable to UL. Rather, the examples should be understood as also applicable to UL. For example, the above-described exemplary HE PPDU frame formats may also be used for a UL HE PPDU transmission that a plurality of STAs simultaneously transmit to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmit to an AP, each STA being a transmission entity may only be aware of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTF section) on each subchannel according to the maximum number of spatial streams, and including information about the number of spatial streams for the individual STA in a HE-SIG-B field.

Alternatively, if the STAs operate according to the common/individual parameters received in the trigger frame from the AP, each STA does not need to indicate the common/individual parameters to the AP during a HE PPDU transmission. Therefore, this information may not be included in a HE PPDU. For example, each STA may determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 13 may be used for a UL HE PPDU transmission.

Figure 13:
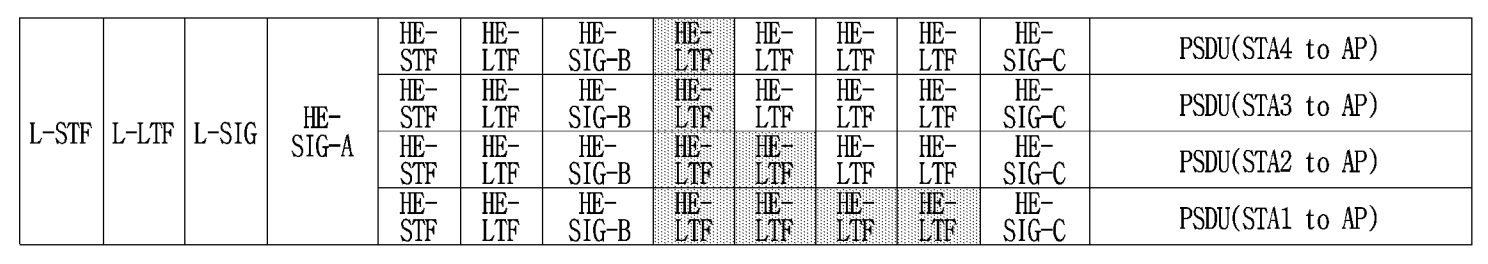

FIG. 13 depicts another exemplary HE PPDU frame format according to the present disclosure. The HE PPDU frame format illustrated in FIG. 13 is characterized in that a structure of HE-SIG-A, HE-SIG-B, and HE-SIG-C fields similar to that in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 13 may not be present. In this case, a description of each field given below may be applicable only in the presence of the field.

In the example of FIG. 13, a HE-SIG-A field is transmitted per channel (i.e., per 20-MHz channel) and may include transmission parameters common to simultaneously transmitted HE PSDUs. Since the same information is transmitted in the fields to HE-SIG-A in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similar to DL MU-MIMO-mode or OFDMA-mode HE PPDU transmission, if transmission of PSDUs start at different time points on subchannels in UL MU-MIMO-mode or OFDMA-mode HE PPDU transmission, and if OFDM symbols are not aligned accordingly, then the implementation complexity of an AP that receives a plurality of PSDUs is increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Figure 14:
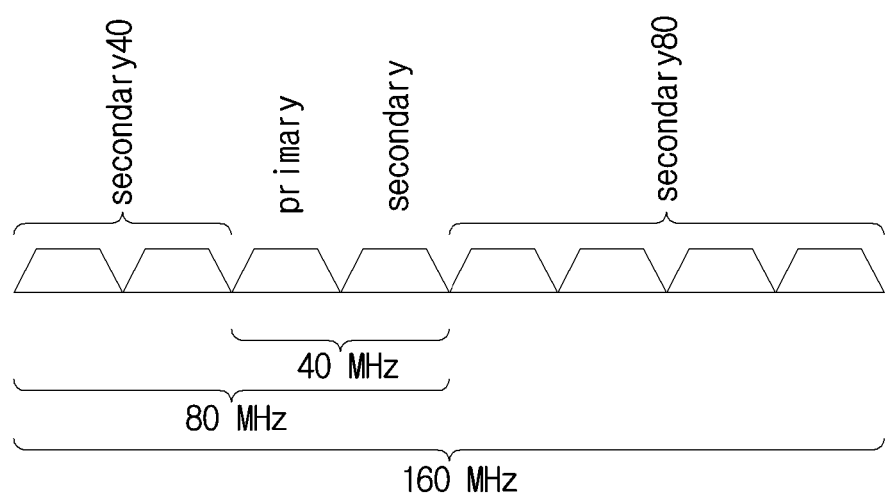
FIGS. 14 and 15 depict operating channels in a WLAN system.
Figure 15:
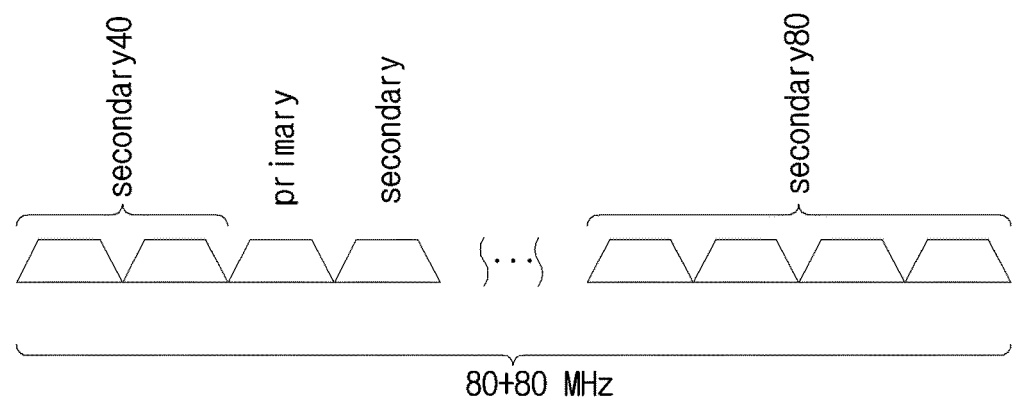

FIGS. 14 and 15 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 14). Further, the WLAN system may support a BSS operating channel having a bandwidth of 160 MHz including non-contiguous 80-MHz channels (called a bandwidth of 80+80 MHz) (refer to FIG. 15).

As illustrated in FIG. 14, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 15, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If an STA uses a channel width larger than the channel width of the primary channel, for data transmission, the STA may use another channel within a corresponding channel, in addition to the primary channel. This additional channel is referred to as a secondary channel.

An STA according to an Enhanced Distributed Channel Access (EDCA) scheme may determine a transmission bandwidth (or a transmission channel width) as follows.

Upon generation of a transmission frame, an STA (e.g., an AP or a non-AP STA) may perform a back-off procedure on a primary channel in order to acquire a Transmission Opportunity (TXOP). For this purpose, the STA may sense the primary channel during a DIFS or AIFS[i]. If the primary channel is idle, the STA may attempt to transmit the frame. The STA may select a random back-off count, wait for a slot time corresponding to the selected random back-off count, and then attempt to transmit the frame. The random back-off count may be determined to be a value ranging from 0 to CW (CW is a value of a contention window parameter).

When the random back-off procedure starts, the STA may activate a back-off timer according to the determined back-off count and decrement the back-off count by 1 each time. If the medium of the corresponding channel is monitored as busy, the STA discontinues the count-down and waits. If the medium is idle, the STA resumes the count-down. If the back-off timer reaches 0, the STA may determine a transmission bandwidth by checking whether the secondary channel is idle or busy at the corresponding time point.

For example, the STA may monitor a channel-idle state during a predetermined IFS (e.g., DIFS or AIFS[i]) on the primary channel and determine a transmission start timing on the primary channel by the random back-off procedure. If the secondary channel is idle during a PIFS shortly before the determined transmission start timing of the primary channel, the STA may transmit a frame on the primary channel and the secondary channel.

As described above, when the back-off timer reaches 0 for the primary channel, the STA may transmit an X-MHz mask PPDU (e.g., where X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH, is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

As described before, if an STA is allowed to start a TXOP and has at least one MAC Service Data Unit (MSDU) to be transmitted under the Access Category (AC) of the TXOP allowed for the STA, the STA may perform one of the following a), b), c), d), or e) (in the following description, FIGS. 14 and 15 may be referred to for a primary channel (i.e., a primary 20-MHz channel) a secondary channel (i.e., a secondary 20-MHz channel), a secondary 40-MHz channel, and a secondary 80-MHz channel):

a) If the secondary channel, the secondary 40-MHz channel, and the secondary 80-MHz channel are idle during a PIFS shortly before the start of the TXOP, a 160-MHz or 80+80-MHz mask PPDU may be transmitted.

b) If both the secondary channel and the secondary 40-MHz channel are idle during the PIFS shortly before the start of the TXOP, an 80-MHz mask PPDU may be transmitted on a primary 80-MHz channel.

c) If the secondary channel is idle during the PIFS shortly before the start of the TXOP, a 40-MHz mask PPDU may be transmitted on a primary 40-MHz channel.

d) A 20-MHz mask PPDU may be transmitted on the primary 20-MHz channel.

e) A channel access attempt may be resumed by performing a back-off procedure as in the case where the medium is indicated as busy on the primary channel by one of physical carrier sensing and virtual carrier sensing and a back-off timer has a value of 0.

Hereinbelow, exemplary HE CCA operations for increasing a spatial reuse gain according to the present disclosure will be described.

A description of basic operations of the PHY layer and MAC layer of an STA in relation to CCA will first be given, followed by a description of specific examples of HE CCA.

A PHY-CCA.indication primitive may be used for the PHY layer to indicate the current status of a medium to a local MAC entity and provide an Idle Power Indicator (IPI) value observed when IPI reporting is turned on.

The PHY-CCA.indication primitive may include parameters as listed in Table IV.

TABLE IV

PHY-CCA.indication(
STATE,
IPI-REPORT,
channel-list
)

In Table IV, the STATE parameter may be set to BUSY or IDLE. If the PHY layer assesses a channel and determines that the channel is not available, the STATE parameter is set to BUSY. On the other hand, if the PHY layer determines that the channel is available, the STATE parameter is set to IDLE.

The IPI-REPORT parameter may be included in the PHY-CCA.indication primitive, when a radio measurement function is activated and IPI reporting is turned on by the IPI-STATE parameter. An IPI is an indication of the total channel power (noise and interference) as measured in a channel at a receiving antenna connector while the STA is neither transmitting nor receiving a frame. The IPI-REPORT parameter provides a set of IPI values for a time interval. The set of IPI values may be used by a MAC sublayer for radio measurement purposes. The set of IPI values may include recent values observed by a PHY entity since the generation of the most recent PHY-TXEND.confirm, PHY-RXEND.indication or PHY-CCA.indication primitive, whichever occurred latest.

When the STATE parameter is IDLE or when, for the type of PHY in operation, CCA is determined for a single channel, the channel-list parameter may not be included in the PHY-CCA.indication primitive. Otherwise, the channel-list parameter may carry a set indicating which channels are busy. The channel-list parameter in a PHY-CCA.indication primitive generated by a HE STA may contain a single element at most. Table V lists channel-list elements.

TABLE IV

| channel-list element | Meaning |
| --- | --- |
| primary | Indicates that the primary 20 MHz channel is busy |
| secondary | Indicates that the secondary 20 MHz channel is busy |
| secondary40 | Indicates that the secondary 40 MHz channel is busy |
| secondary80 | Indicates that the secondary 80 MHz channel is busy |

The PHY-CCA.indication primitive may be generated during a CCA time (i.e., aCCATime) in which the state of the primary channel changes from channel idle to channel busy or from channel busy to channel idle, or when an element of the channel-list parameter is changed. Or the PHY-CCA.indication primitive may be generated when the state of a channel(s) changes from channel idle to channel busy or from channel busy to channel idle, or when an element of the channel-list parameter is changed. The CCA time may include a time period during which the PHY layer receives data. The timing of a PHY-CCA.indication primitive related to a change in the state of a secondary channel(s) may be determined according to the characteristics of the PHY layer.

If an STA is not a HE STA but a VHT STA and an operating channel width is 20 MHz, the PHY layer may keep indicating the channel busy state until expiration of a time period indicated by a LENGTH field. The LENGTH field may be included in a valid SIG field (a NON-HT PPDU format or a VHT PPDU format) or a valid HT-SIG field (a HT-mixed or HT-greenfield PPDU format).

If an STA is not a HE STA but a VHT STA and an operating channel width is 40 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU or 40-MHz PPDU received on the primary channel, or a SIG field (a VHT PPDU format) of a 20-MHz PPDU or 40-MHz PPDU received on the primary channel.

If an STA is not a HE STA but a VHT STA and an operating channel width is 80 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU received on the primary channel or a 40-MHz PPDU received on the 40-MHz primary channel, or a SIG field (a VHT PPDU format) of a 20-MHz PPDU received on the primary channel, or a 40-MHz PPDU or 80-MHz PPDU received on the primary 40-MHz channel.

If an STA is not a HE STA but a VHT STA and an operating channel width is 160 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU received on the primary channel or a 40-MHz PPDU received on the 40-MHz primary channel, or a SIG field (a VHT PPDU format) of a 20-MHz PPDU received on the primary channel, a 40-MHz PPDU received on the primary 40-MHz channel, or a 80-MHz PPDU or 160-MHz PPDU received on the primary 80-MHz channel.

If an STA is not a HE STA but a VHT STA and an operating channel width is 80+80 MHz, the PHY layer may keep indicating the channel busy state until expiration of a time period indicated by a LENGTH field. The LENGTH field may be included in a valid SIG field (a NON-HT PPDU format) of a PPDU received on the primary channel, a valid HT-SIG field (a HT-mixed or HT-greenfield PPDU format) of a 20-MHz PPDU received on the primary channel or a 40-MHz PPDU received on the 40-MHz primary channel, or a SIG field (a VHT PPDU format) of a 20-MHz PPDU received on the primary channel, a 40-MHz PPDU received on the primary 40-MHz channel, or a 80-MHz PPDU or 80+80-MHz PPDU received on the primary 80-MHz channel.

If a 20-MHz, 40-MHz, 80-MHz, 160-MHz, or 80+80-MHz operating channel satisfies one of the conditions listed in Table VI, the PHY layer may issue a PHY-CCA.indication (BUSY, {primary}) primitive, and otherwise, the PHY layer may determine that the operating channel is idle. The PHY layer may detect at least the start of a PPDU occupying the primary 20-MHz channel within a period of aCCATime and maintain CCA signal busy (i.e., PHY-CCA.indication (BUSY, channel-list)) during the duration of the PPDU, with a probability exceeding 90%.

TABLE VI

| Operating Channel Width | Conditions |
| --- | --- |
| 20 MHz, 40 MHz, 80 MHz, 160 MHz, or 80 + 80 MHz | The start of a 20 MHz NON_HT or HT or VHT or HEW PPDU in the primary 20 MHz channel at or above −82 dBm. |
| 40 MHz, 80 MHz, 160 MHz, or 80 + 80 MHz | The start of a 40 MHz non-HT duplicate or HT or VHT or HEW PPDU in the primary 40 MHz channel at or above −79 dBm. |
| 80 MHz, 160 MHz, or 80 + 80 MHz | The start of an 80 MHz non-HT duplicate or HT or VHT or HEW PPDU in the primary 80 MHz channel at or above −76 dBm. |
| 160 MHz, or 80 + 80 MHz | The start of a 160 MHz or 80 + 80 MHz non-HT duplicate or HT or VHT or HEW PPDU at or above −73 dBm. |

The receiver issues a PHY-CCA.indication(BUSY, {primary}) primitive for any signal that exceeds a threshold equal to 20 dB above a minimum modulation and coding rate sensitivity (e.g., −82+20=−62 dBm) in the primary 20 MHz channel within a period of aCCATime after the signal arrives at the receiver's receiving antenna(s). Then the receiver does not issue a PHY-CCA.indication(BUSY,{secondary}), PHY-CCA.indication(BUSY, {secondary40}), PHY-CCA.indication(BUSY, {secondary80}), or PHY-CCA.indication(IDLE) primitive, while the threshold continues to be exceeded.

To increase a spatial reuse gain in a HE BSS, a CCA threshold may be increased. If the CCA threshold is increased, the PHY_CCA.indicate(BUSY, channel-list) primitive is invoked at a higher signal strength. Therefore, a HE BSS may disregard an interference signal received from an adjacent HE BSS (or an Overlapping BSS (OBSS)) in an environment in which the coverage of a plurality of HE BSSs are overlapped. That is, the HE BSS may achieve the effect of reducing the coverage of the adjacent HE BSS, while keeping its coverage unchanged.

Two CCA threshold sets are defined in a HE CCA operation which will be described below. One CCA threshold set includes a plurality of CCA thresholds that are applied according to an operating channel width. A second CCA threshold corresponding to an operating channel width in a second CCA threshold set may be defined as a value higher than a first CCA threshold corresponding to the same operating channel width in a first CCA threshold set. For example, the CCA threshold set defined in Table VI is referred to as the first CCA threshold set, and the CCA threshold set including thresholds higher than the thresholds of the first CCA threshold set by a predetermined positive value (Delta), defined in Table VII, is referred to as the second CCA threshold set. Also, the first CCA thresholds (the first CCA threshold set) may be referred to as legacy CCA thresholds (a legacy CCA threshold set), and the second CCA thresholds (the second CCA threshold set) may be referred to as HE or OBSS CCA thresholds (a HE or OBSS CCA threshold set).

TABLE VIII

| Operating Channel Width | Conditions |
| --- | --- |
| 20 MHz, 40 MHz, 80 MHz, 160 MHz, or 80 + 80 MHz | The start of a 20 MHz NON_HT or HT or VHT or HEW PPDU in the primary 20 MHz channel at or above −82 + Delta (positive number) dBm. |
| 40 MHz, 80 MHz, 160 MHz, or 80 + 80 MHz | The start of a 40 MHz non-HT duplicate or HT or VHT or HEW PPDU in the primary 40 MHz channel at or above −79 + Delta (positive number) dBm. |
| 80 MHz, 160 MHz, or 80 + 80 MHz | The start of an 80 MHz non-HT duplicate or HT or VHT or HEW PPDU in the primary 80 MHz channel at or above −76 + Delta (positive number) dBm. |
| 160 MHz, or 80 + 80 MHz | The start of a 160 MHz or 80 + 80 MHz non-HT duplicate or HT or VHT or HEW PPDU at or above −73 + Delta (positive number) dBm. |

Further, one or more HE STAs may transmit, for example, 5-MHz, 10-MHz, or 20-MHz signals on the primary 20-MHz channel. The receiver issues a PHY-CCA.indication(BUSY, {primary}) primitive for any 5-MHz signal that exceeds a threshold equal to 20 dB above a minimum modulation and coding rate sensitivity (e.g., −82+20-6=−68 dBm), any 10-MHz signal that exceeds the threshold equal to 20 dB above the minimum modulation and coding rate sensitivity (e.g., −82+20-3=−65 dBm), or any 20-MHz signal that exceeds the threshold equal to 20 dB above the minimum modulation and coding rate sensitivity (e.g., −82+20=−62 dBm), in the primary 20 MHz channel within a period of aCCATime after the signal arrives at the receiver's receiving antenna(s). Then the receiver does not issue a PHY-CCA.indication(BUSY,{secondary}), PHY-CCA.indication(BUSY, {secondary40}), PHY-CCA.indication (BUSY, {secondary80}), or PHY-CCA.indication(IDLE) primitive, while the threshold continues to be exceeded.

Now, a description will be given of a channel access procedure at a Power Saving Mode (PSM) STA operating in a HE BSS that applies a HE CCA threshold set.

A PSM STA may enter (or switch to) an awake state at a predetermined time point during operation in a doze state. For example, the PSM STA may wake up at every predetermined interval to determine whether an AP has data to transmit to the PSM STA. In the doze state, the STA may wake up at every predetermined interval (e.g., a listen interval) to receive a beacon frame from the AP. The beacon frame includes a Traffic Indication Map (TIM) Information Element (IE), and the TIM IE includes information indicating the presence of buffered traffic for STAs associated with the AP to each STA.

The AP does not know when a PSM STA will enter the awake state until receiving a specific frame from the STA. For example, the PSM STA may transmit to the AP a Power Save-Poll (PS-Poll) frame or trigger frame that requests the AP to transmit a frame to the STA. Unless otherwise restricted, the PS-Poll frame or trigger frame may be transmitted to the AP at an arbitrary time after the STA enters the awake state.

A HE CCA operation of a PSM STA operating in a HE BSS that applies a HE CCA threshold set may be defined as follows.

Even though the PSM STA, which has switched from the doze state to the awake state to perform transmission, is a HE STA, the PSM STA may perform CCA using a legacy CCA threshold set until a frame sequence allowing setting of a correct NAV is detected or a predetermined time period (e.g., a time period equal to a probe delay ProbeDelay) expires. Although a HE STA may use a HE CCA threshold set during a back-off procedure for channel access, the HE STA may not use the HE CCA threshold set in a channel access procedure (e.g., the backoff procedure) until a HE PPDU transmission is detected, to thereby ensure fairness with other legacy STAs.

Figure 16:
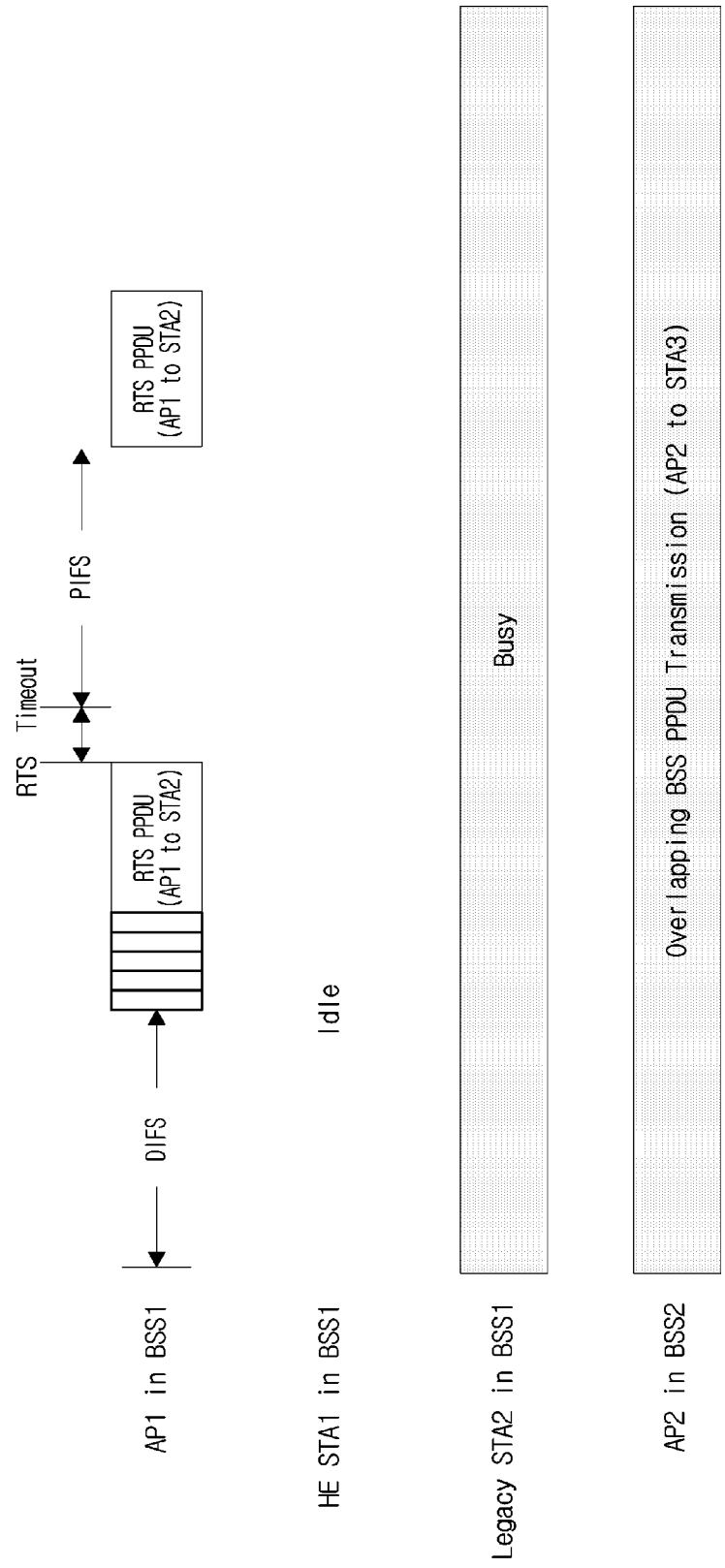
FIGS. 16 and 17 depict exemplary frame exchange sequences each including a HE CCA operation according to the present disclosure.
Figure 17:
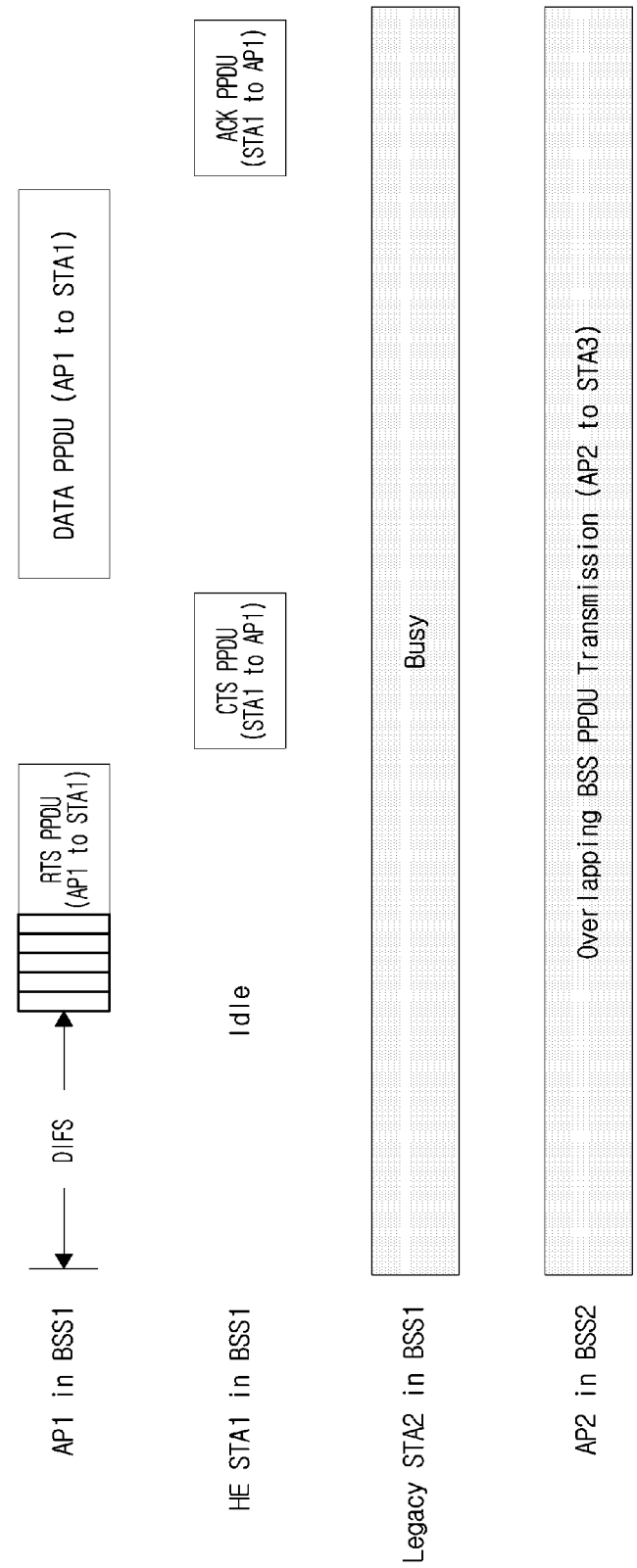

FIGS. 16 and 17 depict exemplary frame exchange sequences each including a HE CCA operation according to the present disclosure.

STAs associated with a HE AP in a HE BSS may include HE STAs and legacy STAs. It is assumed that the HE AP and the HE STAs support dynamic CCA (i.e., dynamic application of a legacy CCA threshold or a HE CCA threshold), and the legacy STAs operate using only the legacy CCA threshold. In this case, CCA results (or NAV results) may be different for the same received signal strength in operations of the HE AP, the HE STAs, and the legacy STAs. For example, for the same received signal strength, a legacy STA may determine a CCA state to be channel busy (or determine to update a NAV), whereas the HE AP or a HE STA may determine the CCA state to be channel idle (or determine not to update a NAV).

In the examples of FIGS. 16 and 17, it is assumed that AP1, STA1, and STA2 belong to BSS1, and AP2 and STA3 belong to an OBSS, BSS2. While AP2 is transmitting a PPDU (i.e., an OBSS PPDU from the perspective of AP1, STA1, and STA2) to STA3, the CCA states (or NAV states) of AP1, STA1, and STA3 that belong to BSS1 may be different. That is, AP1 and STA1 which are a HE AP and a HE STA, respectively using a HE CCA threshold may determine their CCA states (or NAV states) to be channel idle, whereas STA2 which is a legacy STA applying a legacy CCA threshold may determine a CCA state (or NAV state) to be channel busy.

While STA2, a legacy STA, does not attempt channel access, determining that the channel is busy, AP1, a HE AP, may start a backoff procedure after a DIFS because the channel is idle during the DIFS, count down a backoff timer in the case of the channel idle state, and upon expiration of the backoff timer, transmit an RTS PPDU. In other words, AP1 using the HE CCA threshold may acquire a channel access opportunity earlier than STA2, a legacy STA.

As in the example of FIG. 16, if AP1 operating based on the HE CCA threshold transmits an RTS PPDU to STA2 operating based on the legacy CCA threshold, STA2 does not transmit a CTS PPDU to AP1 because the CCA state (or NAV state) of STA2 is channel busy. AP1, which has failed in receiving a CTS PPDU during an RTS timeout interval after transmitting the RTS PPDU, may retransmit the RTS PPDU if the channel is idle during a PIFS. However, since a target STA of the retransmitted RTS PPDU, STA2 does not transmit a CTS PPDU, still determining that the channel is busy, AP1 is highly likely to continuously fail in RTS PPDU transmissions, thereby degrading system performance.

In the example of FIG. 17, AP1 using the HE CCA threshold may transmit an RTS PPDU to one of STAs using the HE CCA threshold, that is, STA1. Upon receipt of the RTS PPDU, STA1 may transmit a CTS PPDU to AP1, determining the channel idle state according to the HE CCA threshold. Upon successful receipt of the CTS PPDU, AP1 may transmit a DATA PPDU to STA1 and receive an ACK PPDU in response to the DATA PPDU from STA1. Thus, the frame exchange sequence for DATA PPDU transmission may be successfully completed.

As described above with reference to FIGS. 16 and 17, if AP1 using the HE CCA threshold selects one (e.g., STA1) of STAs using the same HE CCA threshold as a target STA of an RTS PPDU, the CCA state (or NAV state) of the target STA of the RTS PPDU is highly likely to be channel idle. On the contrary, if AP1 selects, as a target STA of an RTS PPDU, one (e.g., STA2) of legacy STAs operating using the legacy CCA threshold instead of the HE CCA threshold, the CCA state (or NAV state) of the target STA of the RTS PPDU may be highly likely not to be channel idle.

Because an STA using a legacy CCA threshold and an STA using a HE CCA threshold may determine different channel states as described above, frame exchange between the STAs may be failed with a high probability. To avert this problem, if an STA supporting dynamic CCA transmits a PPDU, the type of a CCA threshold used to determine a channel state for transmission of the PPDU (i.e., a first-type (legacy) CCA threshold or a second-type (HE) CCA threshold) may be matched to the type of a target STA of the PPDU (i.e., a first-type (legacy) STA or a second-type (HE) STA). In regards to this, examples of the present disclosure will be described with reference to FIGS. 18 and 19.

Figure 18:
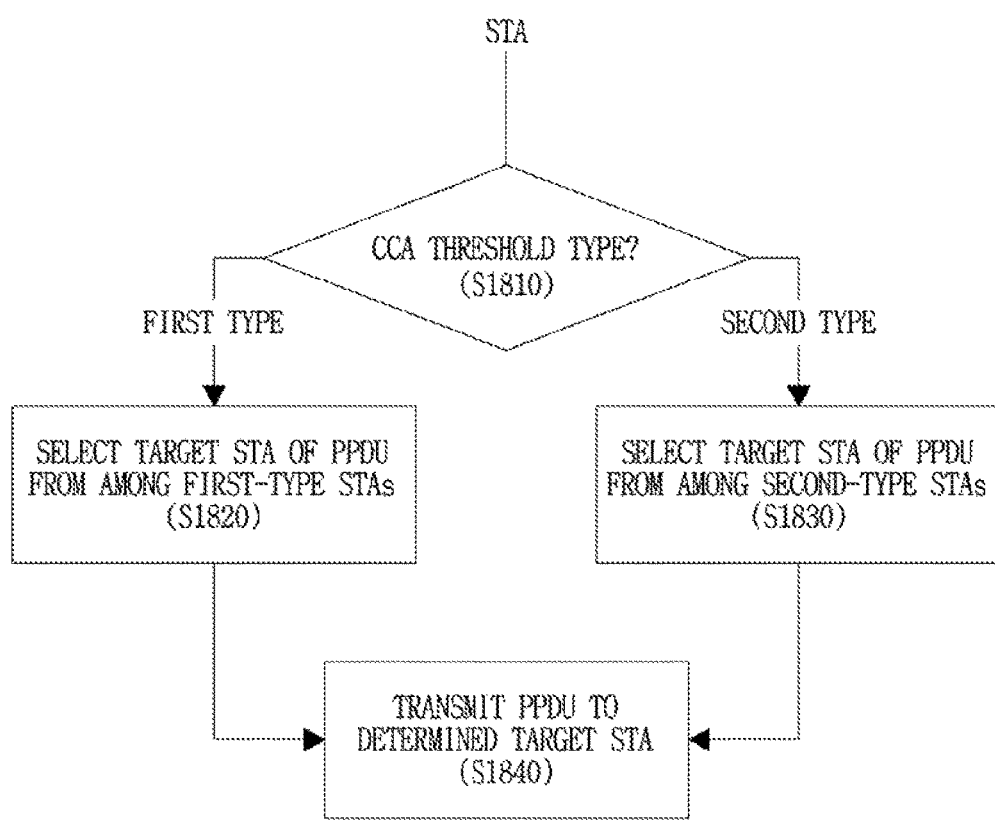
FIGS. 18 and 19 are flowcharts depicting dynamic CCA operations according to the present disclosure.
Figure 19:
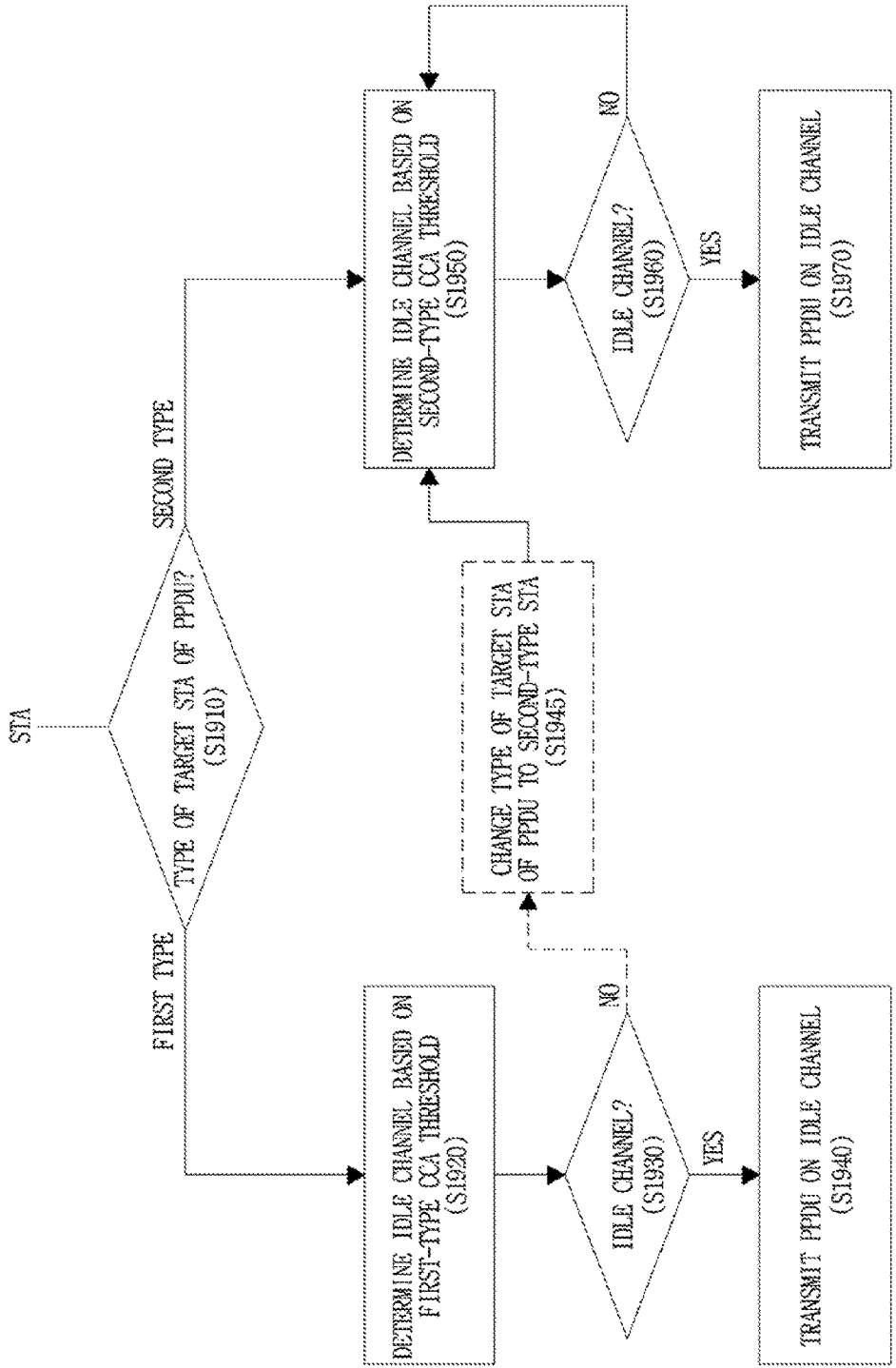

FIGS. 18 and 19 are flowcharts depicting dynamic CCA operations according to the present disclosure.

As in the example of FIG. 18, if an STA supporting dynamic CCA transmits a PPDU, the type of a target STA of the PPDU may be determined based on the type of a CCA threshold used to determine a channel state for transmission of the PPDU.

In step S1810, the STA supporting dynamic CCA may determine whether a CCA threshold type used to determine a CCA state (or NAV state) for transmission of a PPDU is the first type or the second type. If the STA has determined the channel state using a first-type CCA threshold, the STA that will transmit the PPDU may determine a first-type STA as a target STA of the PPDU in step S1820. If the STA has determined the channel state using a second-type CCA threshold, the STA that will transmit the PPDU may determine a second-type STA as a target STA of the PPDU in step S1830. In step S1840, the STA may transmit the PPDU to the determined target STA (i.e., the first-type STA or the second-type STA).

In a specific example, if a HE AP or a HE STA is to transmit an RTS PPDU by acquiring a channel access opportunity (or Transmission Opportunity (TXOP)) based on a first-type CCA threshold (i.e., a legacy CCA threshold), the HE AP or HE STA may select a target STA of the RTS PPDU from among first-type STAs (i.e., legacy STAs) that do not support dynamic CCA (i.e. do not apply a HE CCA threshold). That is, an AP or STA using the first-type CCA threshold (i.e., a legacy CCA threshold) may not select a target STA of an RTS PPDU from among second-type STAs (i.e., HE STAs) supporting dynamic CCA (i.e., applying the HE CCA threshold).

If the HE AP or HE STA is to transmit an RTS PPDU by acquiring a channel access opportunity (or TXOP) based on the second-type CCA threshold (i.e., the HE CCA threshold), the HE AP or HE STA may select a target STA of the RTS PPDU from among second-type STAs (i.e., HE STAs) supporting dynamic CCA (i.e. applying the HE CCA threshold). That is, the AP or STA using the second-type CCA threshold (i.e., the HE CCA threshold) may not select a target STA of the RTS PPDU from among first-type STAs (i.e., legacy STAs) that do not support dynamic CCA (i.e., that do not apply the HE CCA threshold).

The example of FIG. 19 depicts an operation for, when an STA supporting dynamic CCA transmits a PPDU, determining the type of a CCA threshold for use in determining a channel state for transmission of the PPDU based on the type of a target STA of the PPDU by the STA. The example of FIG. 19 may overcome the problem that when the type of a target STA is restricted according to the type of a CCA threshold used for a PPDU to be transmitted as in the example of FIG. 18, it is difficult to maintain throughput fairness between legacy STAs and HE STAs.

In step S1910, an STA supporting dynamic CCA may determine whether the type of a target STA of a PPDU to be transmitted is the first type or the second type.

If the STA is to transmit the PPDU to a first-type STA, the STA may determine an idle channel based on a first-type CCA threshold in step S1920. In the presence of an idle channel in step S1930, the STA may transmit the PPDU in the bandwidth of the idle channel to the first-type STA in step S1940. On the contrary, in the absence of an idle channel in step S1930, the STA may return to step S1920 and determine an idle channel based on the first-type CCA threshold during another time interval in step S1920.

If the STA is to transmit the PPDU to a second-type STA, the STA may determine an idle channel based on a second-type CCA threshold. In the presence of an idle channel in step S1960, the STA may transmit the PPDU in the bandwidth of the idle channel to the second-type STA in step S1970. On the contrary, in the absence of an idle channel in step S1960, the STA may return to step S1950 and determine an idle channel based on the second-type CCA threshold during another time interval in step S1950.

Additionally, in the absence of an idle channel in step S1930, the STA may change the target STA of the PPDU transmission to a second-type STA, giving up the PPDU transmission to the first-type STA in step S1945. For example, the first-type CCA threshold may be lower than the second-type CCA threshold. In this case, a current channel state may be determined to be busy based on the first-type CCA threshold, whereas the current channel state may be determined to be idle based on the second-type CCA threshold. Accordingly, the STA supporting dynamic CCA may increase the efficiency of channel use in transmitting a PPDU.

In a specific example, in the case where a HE STA supporting dynamic CCA is to transmit an RTS PPDU by acquiring a channel access opportunity (or TXOP), if a target STA of the RTS PPDU is a second-type STA (i.e., a HE STA) supporting dynamic CCA (i.e., using a second-type (HE) CCA threshold), the HE STA may re-check CCA states (or NAV states) for a primary channel, a secondary channel, a secondary 40-MHz channel, and a secondary 80-MHz channel based on the CCA threshold used by the target STA (i.e., the second-type (HE) CCA threshold), and transmit the PPDU only on a channel indicated as idle by the CCA (or NAV) results, limiting a transmission bandwidth to the idle channel.

In the case where a HE STA supporting dynamic CCA is to transmit an RTS PPDU by acquiring a channel access opportunity (or TXOP), if a target STA of the RTS PPDU is a first-type STA (i.e., a legacy STA) that does not support dynamic CCA (i.e., uses a first-type (legacy) CCA threshold), the HE STA may re-check CCA states (or NAV states) for a primary channel, a secondary channel, a secondary 40-MHz channel, and a secondary 80-MHz channel based on the CCA threshold used by the target STA (i.e., the first-type (legacy) CCA threshold), and transmit the PPDU only on a channel indicated as idle by the CCA (or NAV) results, limiting a transmission bandwidth to the idle channel.

Or in the case where a HE STA supporting dynamic CCA is to transmit an RTS PPDU by acquiring a channel access opportunity (or TXOP) based on a first-type CCA threshold (i.e., a legacy CCA threshold), if a target STA of the RTS PPDU is a second-type STA (i.e., a HE STA) supporting dynamic CCA (i.e., using a second-type (HE) CCA threshold), the HE STA may re-check CCA states (or NAV states) for a primary channel, a secondary channel, a secondary 40-MHz channel, and a secondary 80-MHz channel based on the CCA threshold used by the target STA (i.e., the second-type (HE) CCA threshold), and transmit the PPDU only on a channel indicated as idle by the CCA (or NAV) results, limiting a transmission bandwidth to the idle channel.

Further, in the case where a HE STA supporting dynamic CCA is to transmit an RTS PPDU by acquiring a channel access opportunity (or TXOP) based on a second-type CCA threshold (i.e., a HE CCA threshold), if a target STA of the RTS PPDU is a second-type STA (i.e., a HE STA) supporting dynamic CCA (i.e., using a second-type (HE) CCA threshold), the HE STA may transmit the PPDU only on a channel indicated as idle by a CCA (or NAV) result at the time of acquiring the channel access opportunity (or TXOP) without the need for re-checking CCA states (or NAV states) for a primary channel, a secondary channel, a secondary 40-MHz channel, and a secondary 80-MHz channel based on the CCA threshold used by the target STA (i.e., the second-type (HE) CCA threshold), and limit a transmission bandwidth to the idle channel.

Also, in the case where a HE STA supporting dynamic CCA is to transmit an RTS PPDU by acquiring a channel access opportunity (or TXOP) based on a second-type CCA threshold (i.e., a HE CCA threshold), if a target STA of the RTS PPDU is a first-type STA (i.e., a legacy STA) that does not support dynamic CCA (i.e., uses a first-type (legacy) CCA threshold), the HE STA may re-check CCA states (or NAV states) for a primary channel, a secondary channel, a secondary 40-MHz channel, and a secondary 80-MHz channel based on the CCA threshold used by the target STA (i.e., the first-type (legacy) CCA threshold), and transmit the PPDU only on a channel indicated as idle by the CCA (or NAV) results, limiting a transmission bandwidth to the idle channel.

Also, in the case where a HE STA supporting dynamic CCA is to transmit an RTS PPDU by acquiring a channel access opportunity (or TXOP) based on a first-type CCA threshold (i.e., a legacy CCA threshold), if a target STA of the RTS PPDU is a first-type STA (i.e., a legacy STA) that does not support dynamic CCA (i.e., uses the first-type (legacy) CCA threshold), the HE STA may transmit the PPDU only on a channel indicated as idle by a CCA (or NAV) result at the time of acquiring the channel access opportunity (or TXOP) without the need for re-checking CCA states (or NAV states) for a primary channel, a secondary channel, a secondary 40-MHz channel, and a secondary 80-MHz channel based on the CCA threshold used by the target STA (i.e., the first-type (legacy) CCA threshold), and limit a transmission bandwidth to the idle channel.

According to a CCA (or NAV) result, a HE AP or HE STA which has acquired a channel access opportunity (or TXOP) may perform a backoff procedure again, giving up RTS PPDU transmission to a legacy STA as a target STA, or perform RTS PPDU transmission by changing the target STA from the legacy STA to a HE STA.

While it has been described in the above examples of the present disclosure that a CCA state is determined using physical carrier sensing based on the received signal strength of a PPDU determined at the PHY layer of an STA, the CCA state may be determined in further consideration of a result of virtual carrier sensing in which a channel busy/idle state is determined according to a NAV value set based on a Duration field included in the MAC header of a PPDU received at the MAC layer of the STA.

An additional example of HE CCA according to the present disclosure will be described below. According to an example of the present disclosure, a different CCA threshold may be applied depending on whether a PPDU received by an STA has been transmitted from the same BSS as or a different BSS from a BSS associated with the STA.

Hereinbelow, a PPDU or frame transmitted from the same BSS as a BSS associated with an STA may be referred to as an intra-BSS PPDU or frame, and a PPDU or frame transmitted from a different BSS from the BSS associated with the STA may be referred to as an inter-BSS PPDU or frame.

In an environment in which legacy STAs and HE STAs are collocated in a HE BSS, a HE STA using a HE CCA threshold set may disregard signals from legacy STAs at the boundary of the coverage of the HE BSS. Therefore, to apply the HE CCA threshold set, a HE AP or HE STA may further determine whether a current received PPDU has been transmitted from an AP or STA belonging to the same BSS as a BSS of the HE AP or HE STA, or an AP or STA belonging to another adjacent BSS. That is, a CCA operation based on a received PPDU may be different depending on whether the PPDU is from the same BSS or not. For example, if a received PPDU is from the same BSS, the PPDU is transmitted to the MAC layer irrespective of the received signal strength of the received PPDU, and the channel may be regarded as busy during a time period indicated by a LENGTH field included in a SIG field of the PPDU. If the received PPDU is from a different BSS and the received signal strength of the PPDU is less than the HE CCA threshold, the PPDU may be discarded and the channel may be regarded as idle. As a consequence, a spatial reuse gain may be increased, and power consumption may be reduced by discontinuing reception of a PPDU transmitted from a different BSS.

To allow an STA receiving a PPDU to apply a different CCA threshold according to whether the received PPDU is from the same BSS as or a different BSS from a BSS to which the STA belongs in the above manner, BSS identification information may be included in the PPDU. The BSS identification information may be included in the PHY header or DATA field of the PPDU. If the BSS identification information is included in the PHY header of the PPDU, partial AID information identifying a target STA of the PPDU may be used for the BSS identification information, or the BSS identification information may be defined as separate information (e.g., information included in a HE-SIG-A or HE-SIG-B field). If the BSS identification information is included in the DATA field of the PPDU, the RA and/or TA of the MAC header of the PPDU, information indicating a scrambler sequence initial state, or a HT Control field of a Control Wrapper PPDU may be used for the BSS identification information.

Figure 20:
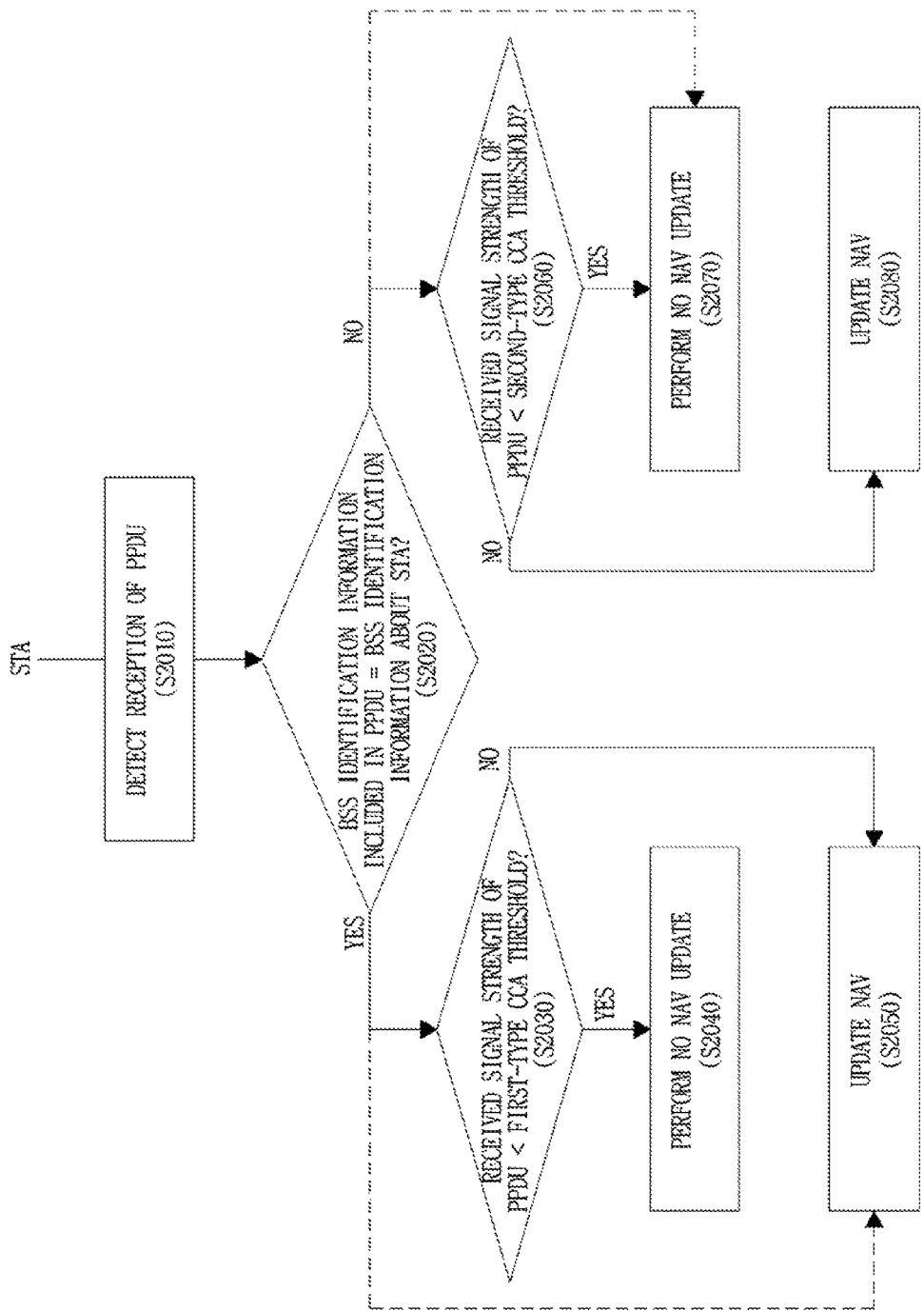
FIG. 20 is a flowchart depicting a NAV update operation based on BSS identification information according to the present disclosure.

FIG. 20 is a flowchart depicting a NAV update operation based on BSS identification information according to the present disclosure.

In step S2010, an STA may detect reception of a PPDU. The received PPDU may not be destined for the STA as a target STA.

In step S2020, the STA may determine whether BSS identification information included in the received PPDU is identical to BSS identification information about a BSS to which the STA belongs. One or more of information included in the PHY header of the PPDU, information included in the DATA field of the PPDU, and information included in the MAC header of the PPDU may be used as the BSS identification information. More specifically, the BSS identification information included in the PHY header of the PPDU may be a partial AID field or COLOR field included in a SIG (e.g., HE-SIG-A or HE-SIG-B) field. The BSS identification information included in the DATA field of the PPDU may be included in Scrambler Init indicating a scrambler sequence initial state as described with reference to FIGS. 21 and 22. The BSS identification information included in the MAC header of the PPDU may correspond to an RA or TA field, or the BSS identification information may be included in the HT Control field of a Control Wrapper frame.

If the BSS identification information included in the received PPDU is identical to the identification information about the BSS to which the STA belongs, the STA may perform a NAV update based on a first-type CCA threshold (e.g., a legacy CCA threshold) in step S2030.

If the PHY layer of the STA determines that the received signal strength of the PPDU is less than the first-type (legacy) CCA threshold, the STA may determine a CCA state to be channel idle, or may not perform the NAV update, discarding the PPDU without transmitting the PPDU to the MAC layer in step S2040.

If the PHY layer of the STA determines that the received signal strength of the PPDU is equal to or larger than the first-type (legacy) CCA threshold, the STA may determine the CCA state to be channel busy, or may transmit the PPDU to the MAC layer and thus perform the NAV update based on the value of the Duration field included in the MAC header of the PPDU in step S2050.

Or if the STA determines that the BSS identification information included in the received PPDU is identical to the identification information about the BSS to which the STA belongs, the STA may directly proceed to step S2050. That is, irrespective of the received signal strength of the PPDU, the PHY layer of the STA may transmit the PPDU to the MAC layer and thus perform the NAV update based on the value of the Duration field of the MAC header of the PPDU. Or the STA may regard the channel as busy during a time period indicated by the value of the LENGTH field of a SIG field of the PPDU.

If the BSS identification information included in the received PPDU is different from the identification information about the BSS to which the STA belongs, the STA may perform the NAV update based on a second-type CCA threshold (e.g., a HE CCA threshold) in step S2060.

If the PHY layer of the STA determines that the received signal strength of the PPDU is less than the second-type (HE) CCA threshold, the STA may determine the CCA state to be channel idle, or may not perform the NAV update, discarding the PPDU without transmitting the PPDU to the MAC layer in step S2070.

If the PHY layer of the STA determines that the received signal strength of the PPDU is equal to or larger than the second-type (HE) CCA threshold, the STA may determine the CCA state to be channel busy, or may transmit the PPDU to the MAC layer and thus perform the NAV update based on the value of the Duration field of the MAC header of the PPDU in step S2070.

Or If the STA determines that the BSS identification information included in the received PPDU is different from the identification information about the BSS to which the STA belongs, the STA may directly proceed to step S2070. That is, irrespective of the received signal strength of the PPDU, the PHY layer of the STA may not transmit the PPDU to the MAC layer and thus may not perform the NAV update.

As described above, an STA may determine whether a received PPDU is from the same BSS as or a different BSS from a BSS to which the STA belongs, based on BSS identification information included in the received PPDU, and perform a different type of NAV update operation depending on the same BSS or a different BSS.

Among the foregoing examples of BSS identification information, a 3-bit COLOR field may be used. In the case of a HE PPDU, BSS identification information (e.g., a COLOR field) may be included in the PHY header (e.g., HE-SIG-A or HE-SIG-B) of the HE PPDU. A HE AP transmitting the HE PPDU may set a COLOR value being a TXVECTOR parameter to a value selected from 0 to 7 and maintain the COLOR value while the BSS exists. A HE AP which is a member of a set of a plurality of BSSIDs may set the same COLOR value for the different BSSIDs.

Meanwhile, the PHY header of a legacy PPDU may not be modified to include BSS identification information, and thus there exists a need for another method for including BSS identification information in a legacy PPDU.

Now, a description will be given of BSS identification information that may be included in a legacy PPDU.

For a control frame transmitted in a legacy PPDU, such as an RTS frame, a CTS frame, a Contention Free (CF)-END frame, a PS-Poll frame, an ACK frame, or a Block ACK frame, BSS identification information may be included in information indicating a scrambler sequence initial state used for PSDU transmission.

Scrambling is a mechanism of increasing randomness for a DATA field including a PSDU in a PPDU format to transmit the PSDU more robustly against interference.

Figure 21:
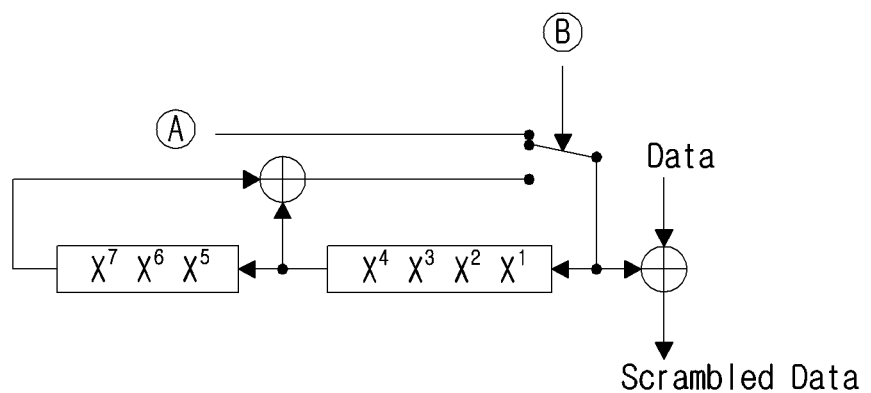
FIG. 21 depicts a data scrambler.

FIG. 21 depicts a data scrambler.

In a PPDU frame format, a DATA field including a SERVICE field, a PSDU field, a TAIL field, and a PAD field (refer to FIG. 6) may be scrambled by a length-127 PPDU-synchronous scrambler as illustrated in the example of FIG. 21.

If the initial states of all bits are 1s, a 127-bit sequence generated by the scrambler is 00001110 11110010 11001001 00000010 00100110 00101110 10110110 00001100 11010100 11100111 10110100 00101010 11111010 01010001 10111000 1111111. The same scrambler is used in scrambling transmission data and descrambling received data.

The data scrambler may place the octets of a PSDU in a transmission serial bit stream in the order of bit 0 to bit 7. The PPDU-synchronous scrambler uses a generator polynomial $S(x)=x^7+x^4+1$, which may be represented as illustrated in FIG. 21.

In FIG. 21, reference character A represents the first 7 bits of a scrambling sequence defined in Table VIII. Reference character B represents, for bit 0 to bit 6 of the scrambling sequence, connection of a switch to a path to A in the presence of CH_BANDWIDTH_IN_NON_HT in TXVECTOR parameters, and connection of the switch to the other path in the absence of CH_BANDWIDTH_IN_NON_HT in the TXVECTOR parameters.

In the absence of CH_BANDWIDTH_IN_NON_HT in the TXVECTOR parameters, the initial state of the scrambler is set not to a pseudorandom zero state but to a non-zero state, for transmission.

In the presence of CH_BANDWIDTH_IN_NON_HT in the TXVECTOR parameters, the first 7 bits of the scrambling sequence is set as illustrated in Table VIII below and also used in initializing the state of the scrambler.

TABLE VIII

| Parameter | Condition | First 7 bits of scrambling sequence | | | | |
|---|---|---|---|---|---|---|
| | | B0 | B3 | B4 | B5 | B6 |
| | | Transmit order → | | | | |
| TXVECTOR | CH_BANDWIDTH_IN_NON_HT is present and DYN_BANDWIDTH_IN_NON_HT is not present in TXVECTOR | 5-bit pseudorandom nonzero integer if CH_BANDWIDTH_IN_NON_HT equals CBW20 and a 5-bit pseudorandom integer otherwise | | | CH_BANDWIDTH_IN_NON_HT | |
| TXVECTOR | CH_BANDWIDTH_IN_NON_HT is present and DYN_BANDWIDTH_IN_NON_HT is present in TXVECTOR | 4-bit pseudorandom nonzero integer if CH_BANDWIDTH_IN_NON_HT equals CBW20 and DYN_BANDWIDTH_IN_NON_HT equals Static, and a 4-bit pseudorandom integer otherwise | | DYN_BANDWIDTH_IN_NON_HT | | |

As noted from Table VIII, in the case where the TXVECTOR parameters include CH_BANDWIDTH_IN_NON_HT without DYN_BANDWIDTH_IN_NON_HT, if the value of CH_BANDWIDTH_IN_NON_HT is CBW20, B0 to B4 out of the first 7 bits of the scrambling sequence are set to a 5-bit pseudorandom non-zero integer, and otherwise, they are set to a 5-bit pseudorandom integer. In this case, B5 and B6 are set to a value of CH_BANDWIDTH_IN_NON_HT.

Also, in the case where the TXVECTOR parameters include both CH_BANDWIDTH_IN_NON_HT and DYN_BANDWIDTH_IN_NON_HT, if the value of CH_BANDWIDTH_IN_NON_HT is CBW20 and the value of DYN_BANDWIDTH_IN_NON_HT corresponds to Static, B0 to B3 out of the first 7 bits of the scrambling sequence are set to a 4-bit pseudorandom non-zero integer, and otherwise, they are set to a 4-bit pseudorandom integer. In this case, B4 is set to a value of DYN_BANDWIDTH_IN_NON_HT, and B5 and B6 are set to a value of CH_BANDWIDTH_IN_NON_HT.

3 bits out of 4 bits B0 to B3 in the above-described 7 bits (B0 to B6 in Table VIII) of Scrambler Init indicating a scrambler sequence initial state may be set to BSS identification information (e.g., a COLOR field) according to the present disclosure.

For example, if a HE STA transmits a control frame such as an RTS frame, a CTS frame, a CF-END frame, a PS-Poll frame, an ACK frame, or a Block ACK frame in a legacy PPDU, the HE STA may include BSS identification information (i.e., a COLOR field) in Scrambler Init of a PSDU.

Figure 22:
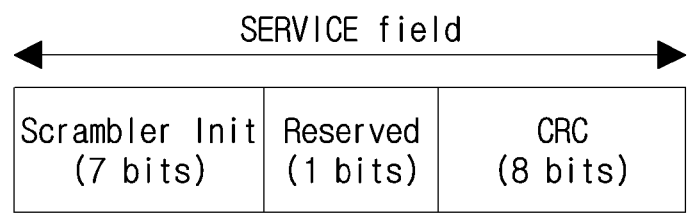
FIG. 22 depicts the configuration of a SERVICE field, when BSS identification information is included in Scrambler Init.

FIG. 22 depicts the configuration of a SERVICE field, when BSS identification information is included in Scrambler Init.

A SERVICE field included in the DATA field of a PPDU may include 7-bit Scrambler Init, one reserved bit, and an 8-bit Cyclic Redundancy Check (CRC). The 8-bit CRC detects an error for the Scrambler Init and may be calculated using an error detection polynomial for the 7-bit Scrambler Init and the one reserved bit. Or unlike the example of FIG. 22, the 8-bit CRC may be replaced with 1-bit parity.

Because the error detection function for Scrambler Init is included in the SERVICE field, it may be determined rapidly whether a PSDU is from the same BSS or a different BSS by checking BSS identification information (e.g., a COLOR field) early (e.g., before detecting the PSDU), thereby increasing dynamic CCA performance.

A HE AP of a specific BSS may indicate the COLOR value of the BSS to HE STAs in advance. For example, the COLOR value of the specific BSS may be included in a predetermined field (e.g., a HE Capabilities Info field of a HE Capabilities element) of a management frame (e.g., a beacon frame, a probe response frame, an association response frame, or a reassociation response frame) transmitted by the HE AP.

The COLOR value of the specific BSS may be used commonly for all HE STAs within the BSS. If the value of a COLOR field included in a received PPDU is different from the COLOR value of a BSS to which a HE STA belongs, the HE STA may determine that the PPDU has been transmitted from an STA in a different BSS from the BSS to which the HE STA belongs. In this case, if the received signal strength of the PPDU is less than a second-type (HE) CCA threshold, the HE STA may discard the received PPDU or determine the result of physical carrier sensing to be a channel idle state. If the received signal strength of the PPDU is equal to or larger than the second-type (HE) CCA threshold, the HE STA may determine the result of physical carrier sensing to be a channel busy state. Or if the value of the COLOR field included in the received PPDU is equal to the COLOR value of the BSS to which the HE STA belongs, the HE STA may consider that the PPDU has been transmitted from an STA within the BSS to which the HE STA belongs. In this case, the PHY layer of the HE STA may transmit the PPDU to the MAC layer of the HE STA irrespective of the received signal strength of the PPDU, as described before.

In this manner, BSS identification information (i.e., a COLOR field) may be used for a third party STA other than a target STA to determine whether a received PPDU has been transmitted from an AP or STA within the same BSS as or a different BSS from a BSS to which the third party STA belongs. Even though a target STA of the PPDU is not a HE STA (i.e., a legacy STA), the BSS identification information (i.e., the COLOR field) may be included in the DATA field of the PPDU. For example, if the target STA of the PPDU is a legacy STA, the COLOR field may also be included in the DATA field (i.e., Scrambler Init in the SERVICE field) of the PPDU, instead of the PHY header of the PPDU.

Additionally, it may be indicated whether BSS identification information (i.e., a COLOR field) is included in Scrambler Init, by the other 1 bit except for 3 bits used for the COLOR field in Scrambler Init. For example, upon receipt of a PPDU with the other bit set to 0, another STA may be aware that BSS identification information is not included in the PPDU, and if the other bit is set to 1, the STA may determine that BSS identification information is included in the PPDU.

Or considering that Scrambler Init is 7 bits long and thus may include a limited amount of information, information indicating the presence or absence of BSS identification information (i.e., a COLOR field) in Scrambler Init may be included in a specific field of the MAC header of the PPDU, instead of Scrambler Init. For example, it may be indicated whether BSS identification information (i.e., a COLOR field) is included in Scrambler Init, using an Address field of the MAC header of the PPDU.

For example, it may be indicated whether BSS identification information (i.e., a COLOR field) is included in Scrambler Init, using a specific 1 bit of a 48-bit MAC address of an RA field in the MAC header of the PPDU. In a more specific example, it may be defined that if 1 bit indicating an Individual/Group Address in the RA field is toggled from 0 to 1, the MAC address included in the RA field is a COLOR Signaling Receiver Address.

If an STA determines that the RA field of the MAC header of a received legacy control frame is set to a COLOR Signaling Receiver Address, the STA may read COLOR information from Scrambler Init, considering that the COLOR information is included in Scrambler Init. An STA transmitting the legacy control frame may set the RA field of the MAC header of the legacy control frame to the COLOR Signaling Receiver Address, if the COLOR information is included in Scrambler Init.

In an additional example, it may be indicated whether BSS identification information (i.e., a COLOR field) is included in Scrambler Init by means of a specific 1 bit out of a 48-bit MAC address in the TA field of the MAC header of a PPDU. In a more specific example, it may be defined that if 1 bit indicating an Individual/Group Address of the TA field is toggled from 0 to 1, a MAC address included in the RA field is a COLOR Signaling Transmitter Address.

If an STA determines that the TA field of the MAC header of a received legacy control frame is set to a COLOR Signaling Transmitter Address, the STA may read COLOR information from Scrambler Init, considering that the COLOR information is included in Scrambler Init. An STA transmitting the legacy control frame may set the TA field of the MAC header of the legacy control frame to the COLOR Signaling Transmitter Address, if the COLOR information is included in Scrambler Init.

FIG. 23 depicts a Control Wrapper frame including BSS identification information according to the present disclosure.

In a legacy control frame (e.g., a CTS PPDU or an RTS PPDU), its MAC header may not have a field capable of including BSS identification information (i.e., a COLOR field). Therefore, it may be contemplated that if the legacy control frame is configured in a Control Wrapper PPDU format, a COLOR field is added using a HT Control field.

A Control Wrapper frame as illustrated in the example of FIG. 23 may be used to carry any other control frame. That is, a legacy control frame (e.g., a CTS frame or an RTS frame) may be transmitted encapsulated in the Control Wrapper frame.

In the example of FIG. 23, a Frame Control field may include Type and Subtype subfields set to a value indicating a Control Wrapper frame and other control information required for transmission/reception of the frame. Duration/ID, Address1, and Carried Frame Control fields may be set based on Duration/ID, Address1, and Frame Control fields of the control frame carried in the Control Wrapper frame. The Carried Frame field may include the fields following Address1 of the control frame carried in the Control Wrapper frame, except for an FCS. A HT Control field may include Link Adaptation Control, Calibration Position, Calibration Sequence, CSI/Steering, NDP Announcement (NDPA), Access Category constraint (AC constraint), and Reverse Direction Grant (RDG)/More PPDU bits, and other reserved bits.

To include BSS identification information related to a control frame in a PPDU, the control frame may be configured in a Control Wrapper frame format. That is, a COLOR field may be included using a part (e.g., reserved bits) of the bits of the HT Control field of a Control Wrapper frame carrying the control frame.

Figure 24:
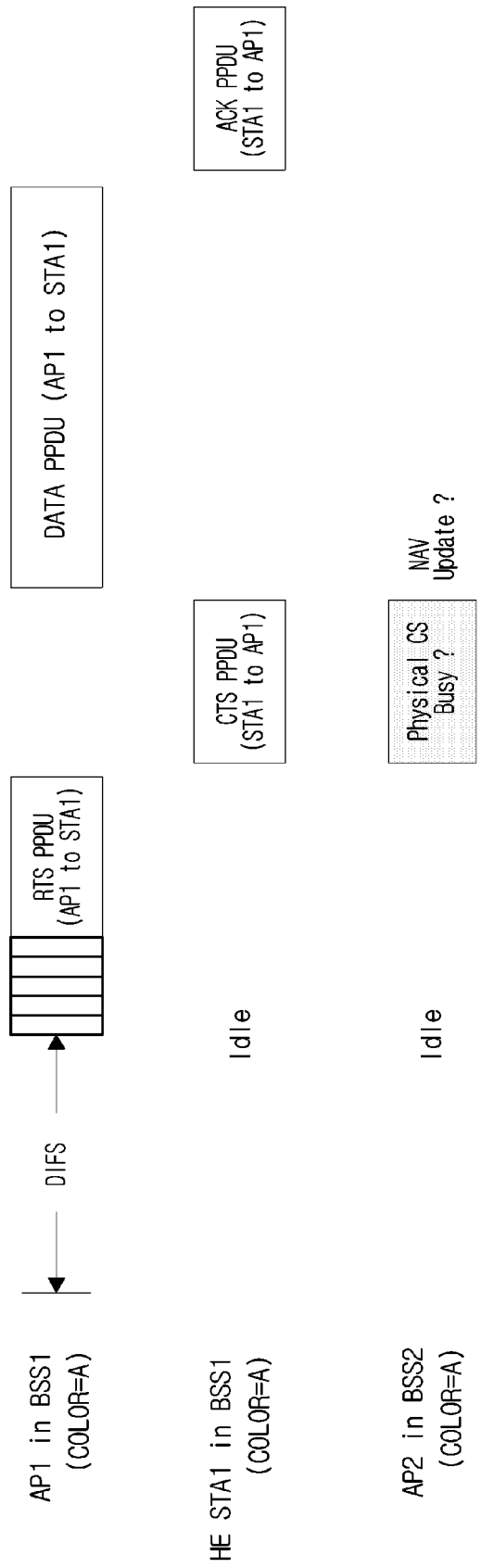
FIG. 24 depicts a NAV update operation based on BSS identification information according to the present disclosure.

FIG. 24 depicts a NAV update operation based on BSS identification information according to the present disclosure.

As described before, a COLOR field may be included in the PHY header or DATA field of a PPDU. For a HE PPDU, the COLOR field may be included in the PHY header, whereas for a legacy PPDU, the COLOR field may be included in Scrambler Init of the SERVICE field of the DATA field. For a control Wrapper PPDU, the COLOR field may be included in the HE Control field.

If the COLOR field is limited to a size of 3 bits, only up to 8 BSSs may be identified. For example, if there are more than 8 OBSSs, different BSSs may use the same COLOR value among the 8 OBSSs. As described above, the COLOR field having a limited number of bits may have a partial meaning in identifying a BSS. In other words, it may occur that adjacent BSSs are not perfectly distinguished from each other just with the COLOR field.

In the example of FIG. 24, it is assumed that although BSS1 and BSS2 are different BSSs, they use the same COLOR value, A. In this case, if AP2 belonging to BSS2 receives an RTS PPDU transmitted from AP1 belonging to BSS1 and a CTS PPDU transmitted in response to the RTS PPDU from STA1 belonging to BSS1, AP2 may consider that the RTS PPDU and the CTS PPDU have been transmitted from an AP and an STA within the same BSS as the BSS to which AP2 belongs (i.e., BSS2). Therefore, AP2 may transmit the received PPDU to the MAC layer irrespective of the received signal strength of the PPDU and set a NAV based on the value of the Duration field of the MAC header.

In the case where the COLOR values of BSS1 and BSS2 are different, if AP2 receives the CTS PPDU transmitted by STA1, AP2 may determine the result of physical carrier sensing to be a channel busy state, only if the received signal strength of the CTS PPDU is equal to or larger than a HE CCA threshold. Otherwise (i.e., if the received signal strength of the CTS PPDU is less than the HE CCA threshold), AP2 may discard the CTS PPDU, or may not perform a NAV update, determining that the result of physical carrier sensing to be a channel idle state.

Meanwhile, as described before with reference to FIG. 20, a different type of NAV update operation may be performed depending on whether the PPDU has been transmitted from the same BSS or a different BSS based on the RA or TA of the MAC header of the received PPDU (legacy PPDU or HE PPDU).

That is, if AP2 receives the CTS PPDU transmitted by STA1 in the example of FIG. 24, the RA field of the MAC header of the CTS PPDU is set to the MAC address of AP1 (i.e., the BSSID of BSS1) which is different from the BSSID of BSS2 to which AP2 belongs. In this case, AP2 may perform a NAV update operation based on a second-type CCA threshold (i.e., a HE CCA threshold).

Specifically, if the received signal strength of the CTS PPDU transmitted by STA1 at AP2 is less than the HE CCA threshold, AP2 may determine the CCA state to be channel idle, determining that the CTS PPDU has not been received, or may not perform a NAV update based on the value of the Duration field of the MAC header of the received PPDU.

If the received signal strength of the CTS PPDU transmitted by STA1 at AP2 is equal to or larger than the HE CCA threshold, AP2 may determine the CCA state to be channel busy, or perform a NAV update based on the value of the Duration field of the MAC header in the received PPDU.

Or upon receipt of the CTS PPDU transmitted by STA1 belonging to BSS1 different from BSS2 to which AP2 belongs, AP2 may not perform a NAV update based on the value of the Duration field of the MAC header in the received PPDU, discarding the received PPDU without transmitting the PPDU to the MAC layer irrespective of the received signal strength of the CTS PPDU transmitted by STA1 at AP2.

If the RA or TA field of a MAC header is used as BSS identification information in this manner, obscurity involved in using only the COLOR field as BSS identification information may be eliminated. That is, even though the STA considers that the received PPDU has been transmitted from the same BSS as the BSS to which the STA belongs based on the COLOR field of the PPDU, if the value of the RA or TA field of the MAC header of the received PPDU does not match the BSSID of the BSS to which the STA belongs, the STA may not perform a NAV update based on the value of the Duration field of the MAC header in the received PPDU.

Additionally, if the STA uses the RA or TA of the MAC header as BSS identification information included in the received PPDU, the STA may determine information to be compared with BSSID information received in advance from an AP associated with the STA between the RA and TA of the received PPDU. For example, the RA or TA may be selected to be compared with the BSSID information about the STA based on information about a transmission direction of the received PPDU. For example, the STA may determine the transmission direction of the received PPDU based on the values of the To DS and From DS bits of the Frame Control field of the MAC header in the PPDU.

The To DS, From DS, and Address fields included in the MAC header of a PPDU are defined as listed in Table IX and Table X.

TABLE IX

| Values of To DS and From DS | Meaning |
|---|---|
| To DS = 0, From DS = 0 | A data frame directed from one STA to another STA within the same IBSS, a data frame direct from one non-AP STA to another non-AP STA within the same BSS, or a data frame outside the context of a BSS, as well as all management and control frames. |
| To DS = 1, From DS = 0 | A data frame destined for the DS or being sent by a STA associated with an AP to the Port Access Entity in that AP. |
| To DS = 0, From DS = 1 | A data frame exiting the DS or being sent by the Port Access Entity in an AP. |
| To DS = 1, From DS = 1 | A data frame using the four-address format. This standard does not define procedures for using this combination of field values. |

Four address fields of the MAC header, Address 1, Address 2, Address 3, and Address 4 may be used to indicate a Basic Service Set Identifier (BSSID), a Source Address (SA), a Destination Address (DA), Transmitter Address (TA), and Receiver Address (RA), and the MAC header may include only a part of the four address fields according to a frame type. Table X below describes the contents of the address fields of the MAC header according to the values of the To DS and From DS subfields of the Frame Control field in the MAC header.

TABLE X

| To DS | From DS | Address 1 | Address 2 | Address 3 MSDU case | Address 3 A-MSDU case | Address 4 MSDU case | Address 4 A-MSDU case |
|---|---|---|---|---|---|---|---|
| 0 | 0 | RA = DA | TA = SA | BSSID | BSSID | N/A | N/A |
| 0 | 1 | RA = DA | TA = BSSID | SA | BSSID | N/A | N/A |
| 1 | 0 | RA = BSSID | TA = SA | DA | BSSID | N/A | N/A |
| 1 | 1 | RA | TA | DA | BSSID | SA | BSSID |

In Table X, RA represents a receiver address, TA represents a transmitter address, DA represents a destination address, and SA represents a source address. Further, the value of each of these address fields Address 1, Address 2, Address 3, and Address 4 may be set in the form of an Ethernet MAC address.

That is, for a UL frame transmitted from a non-AP STA to an AP, To DS=1 and From DS=0, whereas for a DL frame transmitted from an AP to a non-AP STA, To DS=0 and From DS=1.

Upon receipt of a PPDU including a UL frame, an STA may determine that the RA field of the PPDU is to be compared with BSSID information about the STA. Or upon receipt of a PPDU including a DL frame, an STA may determine that the TA field of the PPDU is to be compared with the BSSID information about the STA.

In the example of FIG. 24, if AP2 receives a CTS PPDU directed from STA1 being a HE STA to AP1 being a HE AP, AP2 may determine the transmission direction of the CTS PPDU based on the To DS and From DS bits of the Frame Control field in the MAC header of the CTS PPDU. For example, To DS and From DS may be set to 1 and 0, respectively in the MAC header of the CTS PPDU, and AP2 may determine that the CTS PPDU is a UL frame and thus the value of the RA field of the CTS PPDU is to be compared with BSSID information about AP2. Since the RA field of the CTS PPDU directed from STA1 to AP1 is set to the BSSID of BSS1 (i.e., the MAC address of AP1), AP2 may determine that the value of the RA field of the received CTS PPDU is different from its BSSID value. Therefore, AP2 may consider that the received CTS PPDU has been transmitted from an STA not within the same BSS as the BSS of AP2 but within a different BSS (e.g., OBSS). Accordingly, if the received signal strength of the CTS PPDU is less than a second-type (HE) CCA threshold, AP2 may determine the result of physical carrier sensing to be a channel idle state and may not perform a NAV update.

In another example, if a PPDU received by a third party STA (e.g., a HE STA supporting dynamic CCA) is an RTS PPDU, the third party STA may be aware that a BSSID is included in at least one of the RA and TA of the received RTS PPDU (herein, direct communication between non-AP STAs is not considered). In this case, the third party STA, which has received the RTS PPDU, may determine the transmission direction of the RTS PPDU and accordingly compare one of the RA and TA with BSSID information about the third party STA.

If either of the RA and TA of the received RTS PPDU does not match the BSSID information about the third party STA, the third party STA may consider that the received RTS PPDU has been transmitted from a BSS (e.g., an OBSS) different from a BSS to which the third party STA belongs. Therefore, if the received signal strength of the RTS PPDU is less than the second-type (HE) CCA threshold, the third party STA (may discard the RTS PPDU transmitted from the OBSS or) may not perform a NAV update, determining the result of physical carrier sensing to be a channel idle state.

If one of the RA and TA of the received RTS PPDU matches the BSSID information about the third party STA, the third party STA may consider that the received RTS PPDU has been transmitted from the same BSS as the BSS to which the third party STA belongs. Therefore, irrespective of the received signal strength of the RTS PPDU (or if the received signal strength of the RTS PPDU is equal to or larger than a first-type (legacy) CCA threshold, the third party STA may determine the result of physical carrier sensing to be a channel busy state and), the third party STA may perform a NAV update based on the Duration field of the MAC header of the received RTS PPDU.

Hereinbelow, a NAV reset operation in the case of dynamic CCA will be described. NAV reset may mean initialization of a NAV timer set by a previous NAV update or the like to 0.

Figure 25:
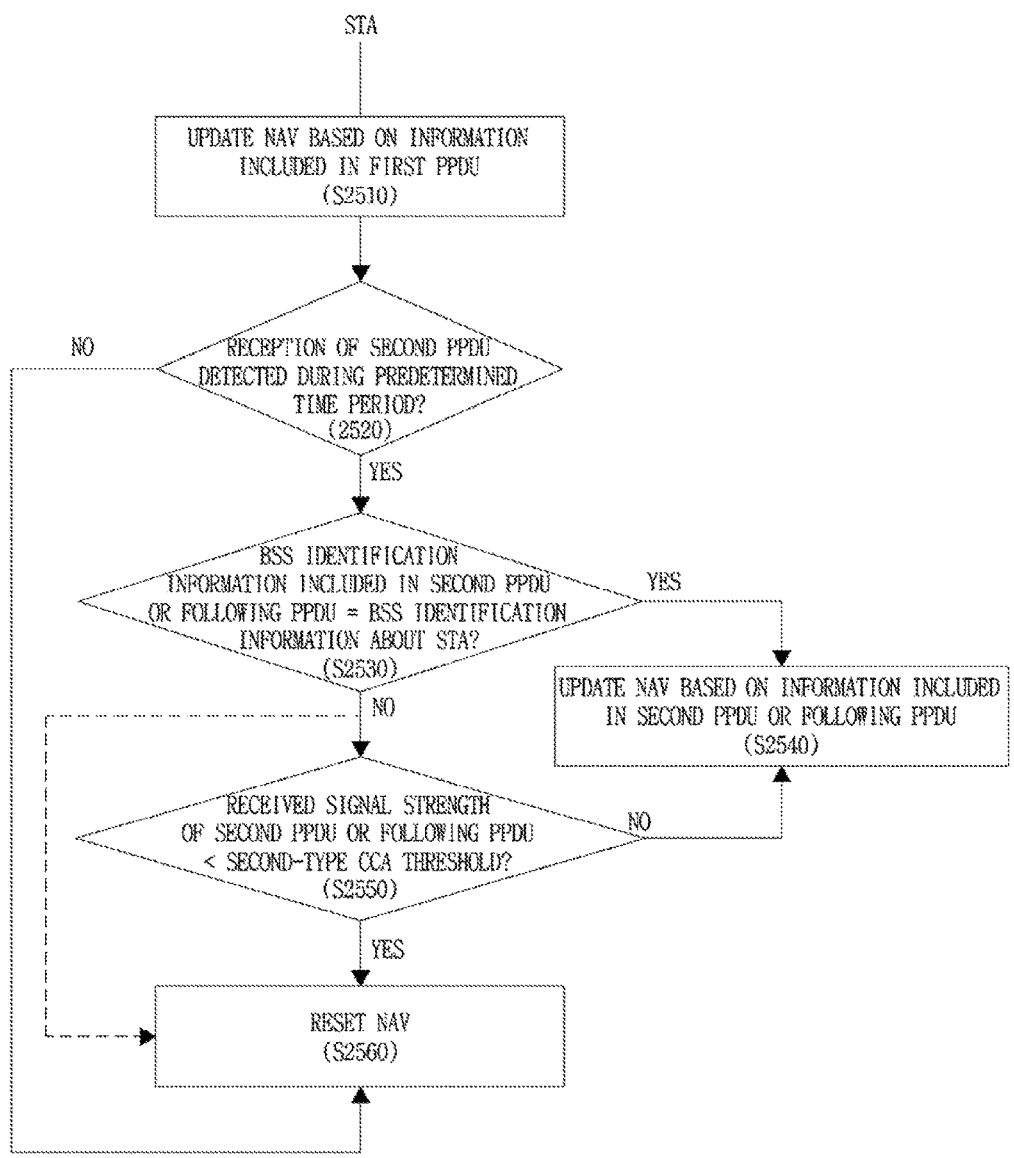
FIG. 25 is a flowchart depicting a NAV reset operation based on BSS identification information according to the present disclosure.

FIG. 25 is a flowchart depicting a NAV reset operation based on BSS identification information according to the present disclosure.

In step S2510, an STA may receive a first PPDU and update its NAV based on information (e.g., duration information in the MAC header) included in the received first PPDU. The first PPDU is not destined for the STA. For example, the first PPDU may include a control frame transmitted from another STA or an AP. Specifically, the first PPDU may include an RTS frame.

In step S2520, the STA may determine whether reception of a second PPDU has been detected during a predetermined time period from a time of completing the reception of the first PPDU.

For example, the second PPDU may include a frame responding to the frame included in the first PPDU. Specifically, if the first PPDU includes an RTS frame, the second PPDU may include a CTS frame. Or the second PPDU may be a new PPDU that is not related to the first PPDU.

If the first PPDU is an RTS frame, the predetermined time period may be set as an RTS timeout interval.

If the second PPDU has not been detected during the predetermined time period, the STA may reset the NAV in step S2540.

Upon detection of reception of the second PPDU during the predetermined time period, the STA may proceed to step S2530. In step S2530, the STA may determine whether BSS identification information included in the second PPDU is identical to BSS identification information about a BSS to which the STA belongs. If reception of the second PPDU has been detected but the second PPDU does not include BSS identification information, the STA may determine whether BSS identification information included in a received new PPDU following the second PPDU is identical to the BSS identification information about the BSS to which the STA belongs. For example, the PPDU following the second PPDU may include a frame responding to a frame included in the second PPDU. Specifically, if the second PPDU includes a CTS frame, the PPDU following the second PPDU may include a DATA frame. Or the PPDU following the second PPDU may be a new PPDU which is not related to the second PPDU.

For example, if the second PPDU includes a CTS frame, the PPDU following the second PPDU may include a DATA frame.

Herein, one or more of information included in the PHY header of a PPDU, information included in the DATA field of the PPDU, and information included in the MAC header of the PPDU may be used as BSS identification information. More specifically, the BSS identification information included in the PHY header of the PPDU may be a partial AID field or a COLOR field included in a SIG (e.g., HE-SIG-A or HE-SIG-B) field. The BSS identification information included in the DATA field of the PPDU may be included in Scrambler Init. The BSS identification information included in the MAC header of the PPDU may correspond to an RA or TA field, or may be included in the HT Control field of a Control Wrapper frame.

If the STA determines that the BSS identification information included in the second PPDU or the PPDU following the second PPDU is identical to the BSS identification information about the BSS to which the STA belongs in step S2530, the STA may update its NAV based on information included in the second PPDU or the PPDU following the second PPDU in step S2540.

If the STA determines that the BSS identification information included in the second PPDU or the PPDU following the second PPDU is not identical to the BSS identification information about the BSS to which the STA belongs in step S2530, the STA may determine if the received signal strength of the second PPDU or the PPDU following the second PPDU is less than a second-type (HE) CCA threshold in step S2550.

If the STA determines that the received signal strength of the second PPDU or the PPDU following the second PPDU is less than the second-type (HE) CCA threshold in step S2550, the STA may reset the NAV (i.e., the NAV updated in step S2510) in step S2560.

If the STA determines that the received signal strength of the second PPDU or the PPDU following the second PPDU is equal to or larger than the second-type (HE) CCA threshold in step S2550, the STA may update its NAV based on information included in the second PPDU or the PPDU following the second PPDU in step S2540.

Or if the STA determines that the BSS identification information included in the second PPDU or the PPDU following the second PPDU is not identical to the BSS identification information about the BSS to which the STA belongs in step S2530, the STA may reset the NAV (i.e., the NAV updated in step S2510) irrespective of the received signal strength of the second PPDU or the PPDU following the second PPDU in step S2560.

In this manner, an STA may determine whether a received PPDU has been transmitted from the same BSS as or a different BSS from a BSS to which the STA belongs, based on BSS identification information included in the received PPDU, and may perform a NAV update operation or a NAV reset operation according to the same BSS or a different BSS.

Now, a description will be given of a NAV reset operation related to RTS/CTS as an example of the NAV reset operation based on BSS identification information.

For example, in the case where an STA does not use dynamic CCA (e.g., the STA is a first-type (legacy) STA), if the STA receives an RTS PPDU and determines that the STA is not a target STA of the RTS PPDU, the STA may set a NAV value based on the Duration field of the MAC header of the RTS PPDU. The NAV value set based on the RTS PPDU may be reset when the PHY layer of the STA fails to detect reception of a new PPDU during an RTS timeout interval. The RTS timeout interval may be set to a period having a duration of (2×aSIFSTime)+(CTS_Time)+aRx-PHYStartDelay+(2×aSlotTime) after completion of the RTS frame reception.

That is, an STA, which has updated a NAV setting using information acquired from an RTS frame as the latest criterion for a NAV setting update, is allowed to reset its NAV, if a PHY-RXSTART.indication primitive has not been detected from the PHY layer of the STA during a time period having a duration of (2×aSIFSTime)+(CTS_Time)+aRx-PHYStartDelay+(2×aSlotTime) from the time of a PHY-RXEND.indication primitive corresponding to detection of the RTS frame.

Herein, CTS_Time may be calculated using a CTS frame length, and a data rate at which an RTS frame used for the latest NAV update has been received.

aSIFSTime may be the sum of a nominal time taken for the PHY layer to transmit to the MAC layer the last bit of a frame received after reception of the last symbol of a PPDU (e.g., aRxRFDelay+aRxPLCPDelay, or aRxPHYDelay), a maximum available time (e.g., aMACProcessingDelay) for the MAC layer to process a transmission start request of the PHY layer, when the MAC layer receives information indicating that the reception has been terminated or a medium is idle from the PHY layer, and a maximum time (e.g., aRxTxTurnaroundTime) required for the PHY layer to switch from a reception operation to a transmission operation.

aSlotTime is a value that may be changed dynamically according to a change of aAirPropagationTime. aSlotTime may be the sum of a maximum time (e.g., aCCATime) available to a CCA mechanism to determine whether the medium is busy or idle in each time slot, the maximum time (e.g., aRxTxTurnaroundTime) required for the PHY layer to switch from a reception operation to a transmission operation, double a signal propagation time between slot-synchronous STAs within a maximum allowed distance (e.g., aAirPropagationTime), and the maximum available time for the MAC layer to process a transmission start request of the PHY layer, when the MAC layer receives information indicating that reception has been terminated or the medium is idle from the PHY layer (e.g., aMACProcessingDelay).

aRxPHYStartDelay may be a delay time from a time at which the PHY layer issues the PHY-RXSTART.indication primitive.

Meanwhile, an STA supporting dynamic CCA (e.g., a second-type (HE) STA) may reset a NAV value set by an RTS PPDU, if the STA fails to detect reception of a new PPDU during an RTS timeout interval at the PHY layer, or detects reception of a PPDU transmitted from an STA belonging to a different BSS from a BSS to which the STA belongs. That is, the STA supporting dynamic CCA may reset a NAV even when it receives a PPDU from an STA belonging to a different BSS (e.g., OBSS) from the BSS of the STA supporting dynamic CCA, in addition to a NAV reset condition for an STA that does not support dynamic CCA.

BSS identification information included in the PPDU received at the STA may be the afore-described COLOR information, partial AID information, RA information, or TA information.

In the case where COLOR information is used as BSS identification information, a NAV reset condition for an STA supporting dynamic CCA may be defined as follows: if an STA, which has updated a NAV setting using information acquired from an RTS frame as the latest criterion for a NAV setting update, fails to detect a PHY-RXSTART.indication primitive from the PHY layer during a time period having a duration of (2×aSIFSTime)+(CTS_Time)+aRxPHYStartDelay+(2×aSlotTime) from the time of a PHY-RXEND.indication primitive corresponding to detection of the RTS frame, or detects the PHY-RXSTART.indication primitive from a PPDU including a COLOR field set to a different value from a BSS COLOR value of the STA, the STA is allowed to reset its NAV.

If a third party STA may not acquire BSS identification information from an RTS PPDU, the third party STA may check BSS identification information (e.g., a COLOR field) in a CTS PPDU, a DATA PPDU, or the like transmitted after the RTS PPDU. If the third party STA acquires a COLOR value from the CTS PPDU, the DATA PPDU, or the like, the third party STA may determine whether an ongoing frame exchange sequence (i.e., exchange of RTS, CTS, DATA, and ACK PPDUs) is performed between STAs within the same BSS as or a different BSS from a BSS to which the third party STA belongs. Also, if the COLOR value acquired from the CTS PPDU, the DATA PPDU, or the like is different from a COLOR value of the BSS to which the third party STA belongs, the third party STA may reset a NAV value set by the RTS PPDU, determining that the ongoing frame exchange sequence (i.e., exchange of RTS, CTS, DATA, and ACK PPDUs) is performed between STAs within a different BSS from the BSS to which the third party STA belongs.

Figure 26:
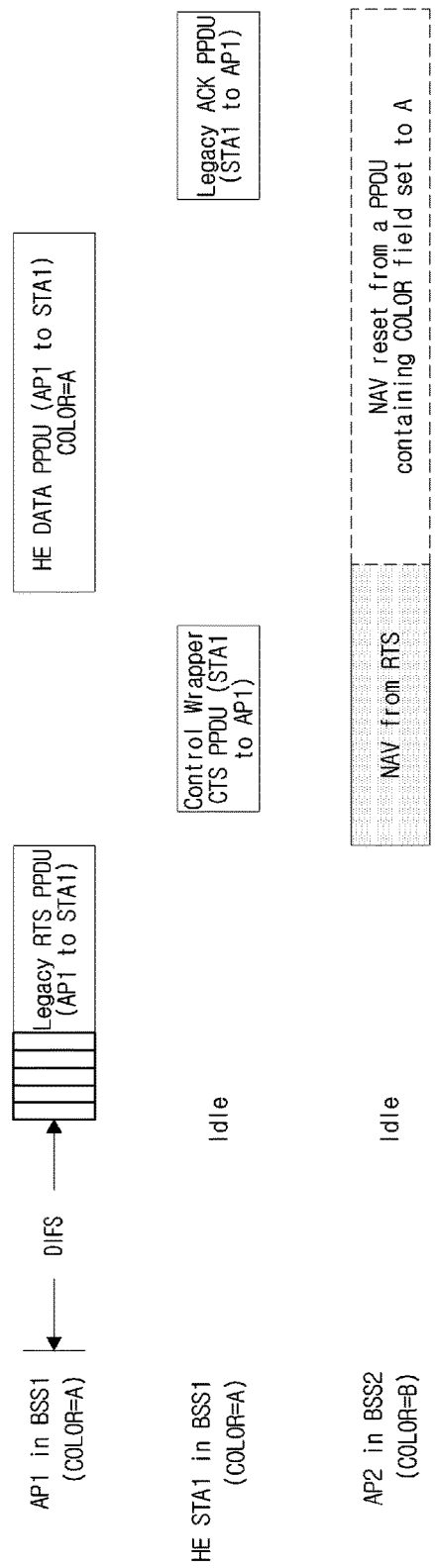
FIG. 26 depicts an exemplary RTS/CTS NAV reset operation based on BSS identification information according to the present disclosure.

FIG. 26 depicts an exemplary RTS/CTS NAV reset operation based on BSS identification information according to the present disclosure.

In the example of FIG. 26, it is assumed that BSS1 and BSS2 have A and B respectively as BSS identification information (e.g., COLOR information). AP1 belonging to BSS1 may transmit an RTS PPDU to STA1 being a HE STA, using a legacy PPDU. If AP2 belonging to BSS2 receives the RTS PPDU directed from AP1 to STA1, AP2 may update its NAV value based on the Duration field of the MAC header of the RTS PPDU, because AP2 is not a target STA of the received RTS PPDU.

Meanwhile, upon receipt of the RTS PPDU from AP1, STA1 may transmit a CTS frame in response to the RTS PPDU to AP1. The CTS frame may include a COLOR field. For example, if STA1 transmits the CTS frame in a Control Wrapper PPDU, STA1 may include a COLOR field using the HE Control field of the Control Wrapper PPDU.

AP2, which has set a NAV using the RTS PPDU, may receive the CTS PPDU or a HE DATA PPDU directed from STA1 to AP1 during an RTS timeout interval. BSS identification information (e.g., COLOR information) included in the CTS PPDU or the HE DATA PPDU received at AP2 is set to the COLOR value A of BSS1, and AP2 may determine that the COLOR value A of BSS1 is different from the COLOR value B of BSS2 to which AP2 belongs. Therefore, if AP2 receives a PPDU including BSS identification information different from its BSS identification information, AP2 may reset the NAV value set from the RTS PPDU.

Additionally, regarding the NAV update operation depicted in FIG. 20, in the case where an STA performs a NAV update based on the value of the Duration field included in a PPDU generated from a different BSS from a BSS to which the STA belongs, the STA may perform the NAV update only when the value of the Duration field in the received PPDU is larger than a current set NAV value of the STA. That is, if the value of the Duration field in the PPDU generated from the different BSS is equal to or less than the current set NAV value of the STA, the STA may not perform the NAV update. Meanwhile, in the case where an STA performs a NAV update based on the value of the Duration field of a PPDU generated from the same BSS, the STA may perform the NAV update based on the value of the Duration field of the received PPDU, unconditionally (i.e., without comparing the value of the Duration field of the received PPDU with a current NAV value of the STA). Therefore, in the case where the STA performs a NAV update based on the value of the Duration field of the PPDU generated from the same BSS, the NAV may be updated to a value smaller than the current NAV value of the STA. Also, regarding the NAV reset operation depicted in FIG. 25, if the STA receives a PPDU generated from the same BSS, the STA may reset its NAV value if the Duration field of the received PPDU is set to 0. If the STA receives a PPDU generated from a different BSS, the STA may not reset its NAV value if the Duration field of the received PPDU is set to 0.

A description will be given of examples of a CCA operation in an STA according to the present disclosure, when BSS identification information included in a received PPDU is not identical to BSS identification information about the STA.

Referring to FIG. 20 again, the STA may determine whether the BSS identification information included in the PPDU received in step S2020 is identical to its BSS identification information. If the BSS identification information included in the received PPDU is not identical to its BSS identification information, the STA may determine whether the received signal strength of the PPDU is less than, or equal to or larger than the second-type (HE) CCA threshold in step S2060.

Referring to FIG. 25 again, the STA may determine whether the BSS identification information included in the PPDU received in step S2530 is identical to its BSS identification information. If the BSS identification information included in the received PPDU is not identical to its BSS identification information, the STA may determine whether the received signal strength of the PPDU is less than, or equal to or larger than the second-type (HE) CCA threshold in step S2550.

As described above, upon receipt of a PPDU (e.g., an OBSS PPDU) including BSS identification information different from BSS identification information about an STA, the STA may or may not perform a NAV update operation or may perform a NA reset operation. This operation includes a CCA operation for determining whether the received signal strength of the received PPDU is less than, or equal to or larger than the second-type (HE) CCA threshold. Primitives exchanged between the PHY and MAC layers of the STA (e.g., PHY-RXSTART.indication, PHY-RXEND.indication, PHY-CCARESET.request) in relation to the CCA operation will be described below in detail.

The PHY-RXSTART.indication primitive is indication information indicating reception of a valid start of a PPDU including a valid PHY header to a local MAC entity by the PHY layer. This primitive provides the parameters illustrated in Table XI below.

TABLE XI

PHY-RXSTART.indication(
RXVECTOR
)

In Table XI, RXVECTOR represents a list of parameters that the PHY layer provides to the local MAC entity, when the PHY layer receives a valid PHY header or the last PSDU data bit of a received frame.

When the PHY layer successfully validates that the PHY header is valid, at the start of a new PPDU, a local PHY entity generates and provides this primitive to a MAC sublayer. After generating the PHY-RXSTART.indication primitive, the PHY layer is expected to maintain a physical medium busy state during a time period required to transmit a frame according to an indicated length and data rate (without generating a PHY-CCA.indication(IDLE) primitive). Even though the PHY later generates a PHY-RXEND.indication(CarrierLost) primitive or a PHY-RXEND.indication(Format-Violation) primitive before expiration of the time period, this physical medium busy condition may be maintained.

Meanwhile, the PHY-RXEND.indication primitive is indication information indicating completion of on-going PSDU reception to the local MAC entity by the PHY layer. This primitive provides the parameters illustrated in Table XII below.

TABLE XII

PHY-RXEND.indication(
RXERROR,
RXVECTOR
)

In Table XII, the RXERROR parameter may provide one or more of values indicating NoError, FormatVioloation, CarrierLost, and UnsupportedRate. After a receive state machine at the PHY layer detects what seems to be a valid preamble and Start Frame Delimiter (SFD), many error conditions may take place. Parameters returned for each of the error conditions are given as follows.

NoError. This value is used to indicate that no error has been generated in a PHY reception process.

Format Violation. This value is used to indicate the presence of an error in the format of the received PPDU.

CarrierLost. This value is used to indicate that PSDU processing may not be performed any longer because a carrier cannot be found during reception of an incoming PSDU.

UnsupportedRate. This value is used to indicate that an unsupported data rate has been detected during reception of the incoming PPDU.

Filtered. This value is used to indicate that a corresponding PPDU has been filtered out due to a condition set by PHYCONFIG_VECTOR during reception of the incoming PSDU.

Additionally, a condition for Filtered may also occur when a HE STA filters out a PPDU due to GROUP_ID or PARIAL_AID or COLOR filtering at the PHY layer. COLOR filtering may include a case in which BSS identification (e.g., a COLOR value) information included in a received PPDU is not identical to BSS identification information (e.g., a COLOR value) about an STA.

In Table XII, RXVECTOR indicates a list of parameters provided to the local MAC entity, when the PHY layer receives a valid PHY header or the last PSDU data bit of a received frame. RXVECTOR is a parameter included only when a dot11RadioMeasurementActivated parameter is set to true. RXVECTOR may include all of MAC parameters and MAC management parameters.

The PHY-RXEND.indication primitive may be generated to indicate to the local MAC entity that the PHY receive state machine has completed reception with or without an error. In the presence of Signal Extension, the PHY-RXEND.indication primitive may be generated at the ending point of a signal extension.

Figure 27:
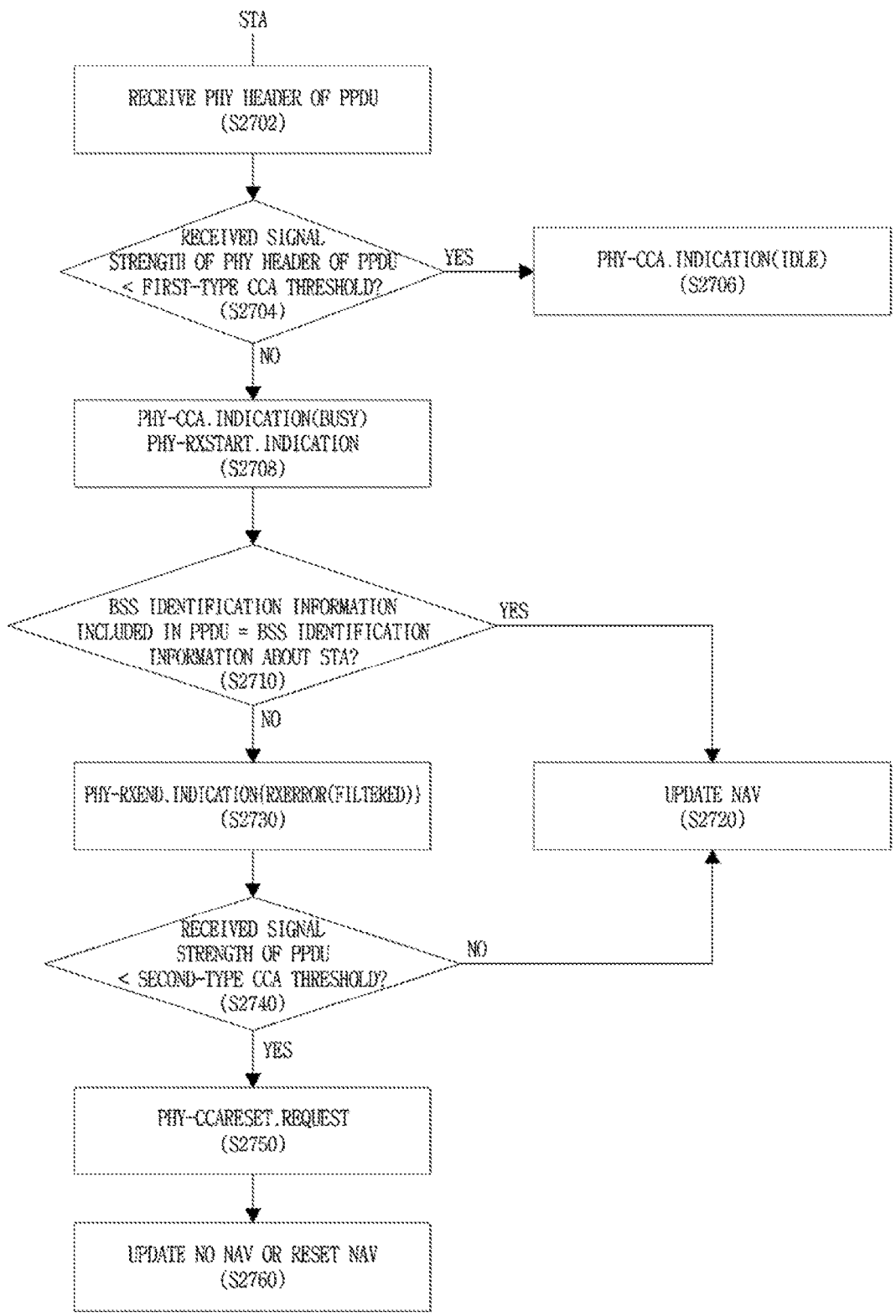
FIG. 27 is a flowchart depicting a dynamic CCA operation based on BSS identification information according to the present disclosure.

FIG. 27 is a flowchart depicting a dynamic CCA operation based on BSS identification information according to the present disclosure.

In step S2702, an STA may receive the PHY header of a PPDU. The PPDU received at the STA may be a PPDU that is not destined for the STA. For example, reception of the PHY header of the PPDU at the STA may include reception of a legacy preamble (i.e., L-STF, L-LTF, and L-SIG). Or reception of the PHY header of the PPDU at the STA may include reception of the legacy preamble and a HE preamble (i.e., HE-STF, HE-LTF, HE-SIG-A, HE-SIG-B, and the like).

In step S2704, the STA may determine whether the received signal strength of the PHY header of the PPDU is less than, or equal to or larger than a first-type (legacy) CCA threshold. For example, if the PHY header of the PPDU does not include BSS identification information, the STA is not capable of determining whether the PPDU has been transmitted from an STA belonging to the same BSS as or a different BSS from a BSS to which the STA belongs.

Therefore, the STA may basically apply the first-type (legacy) CCA threshold to the PPDU, instead of a second-type (HE) CCA threshold.

However, the present invention is not limited thereto. Even though the PHY header of the PPDU includes BSS identification information, the STA may compare the received signal strength of the PHY header with the first-type (legacy) CCA threshold and perform the following operation according to the comparison result.

Or the STA may compare the received signal strength of the PHY header of the PPDU with the second-type CCA threshold. If the received signal strength of the PHY header of the PPDU is equal to or larger than the second-type (HE) CCA threshold, the STA may proceed to step S2708, and if the received signal strength of the PHY header of the PPDU is less than the second-type CCA threshold, the STA may proceed to step S2706. For example, if BSS identification information is included in the PHY header of the PPUD and different from the BSS identification information about the STA, the STA may apply the second-type (HE) CCA threshold, which should not be construed as limiting the present disclosure. Even though BSS identification information is not included in the PHY header of the PPUD, the STA may apply the second-type (HE) CCA threshold.

If the received signal strength of the PHY header of the PPDU is less than the first-type (legacy) CCA threshold, which means that the STA fails to receive a valid PHY header, the STA may not process the received PHY header (the STA may discard the received PHY header), determining that the CCA state is a channel idle state in step S2706. In this case, the STA may not issue a PHY-RXSTART.indication primitive.

If the received signal strength of the PHY header of the PPDU is equal to or larger than the first-type (legacy) CCA threshold, which means that the STA has received a valid PHY header, the STA may determine the CCA state to be a channel busy state in step S2708. In this case, the STA may issue the PHY-RXSTART.indication primitive.

In step S2710, the STA may determine whether the BSS identification information included in the PPDU is identical to the BSS identification information about the STA. For example, if the BSS identification information is included not in the PHY header of the PPDU but in a following field (e.g., the DATA field) of the PPDU, the STA may check the BSS identification information by receiving the following field. However, the present disclosure is not limited thereto and the same operation may be performed even though the BSS identification information is included in the PHY header of the PPDU.

If the BSS identification information included in the received PPDU is identical to the BSS identification information about the STA, the STA may process the received PPDU (e.g., the STA may perform a NAV update) in step S2720.

On the contrary, if the BSS identification information included in the PPDU is not identical to the BSS identification information about the STA, the STA may issue a PHY-RXEND.indication primitive including an RXERROR parameter set to Filtered in step S2730.

In step S2740, the STA may determine whether the received signal strength of the received PPDU is less than, or equal to or larger than the second-type (HE) CCA threshold.

If the received signal strength of the received PPDU is equal to or larger than the second-type (HE) CCA threshold, the STA may process the received PPDU (e.g., the STA may perform a NAV update) in step S2720.

If the received signal strength of the received PPDU is less than the second-type (HE) CCA threshold, the MAC layer of the STA may issue a PHY-CCARESET.request primitive in step S2750, and may not perform a NAV update or perform a NAV reset in step S2760.

As described before, upon receipt of a PPDU (e.g., an OBSS PPDU) including BSS identification information (e.g., a COLOR value) different from BSS identification information (e.g., a COLOR value) about an STA, the PHY layer of the STA may issue a PHY-RXEND.indication primitive, and the RXERROR parameter of the PHY-RXEND.indication primitive may be set to Filtered (S2710 and S2730).

If the PHY layer of the STA receiving the PPDU transmits the PHY-RXEND.indication primitive including an RXERROR parameter set to Filtered to the MAC layer, and the MAC layer determines that the BSS identification information (e.g., a COLOR value) included in the received PPDU is different from the BSS identification information (e.g., a COLOR value) about the STA, the MAC layer may determine whether the received signal strength of the received PPDU is less than, or equal to or larger than the second-type (HE) CCA threshold (S2740).

Upon receipt of the PHY-RXEND.indication {RXERROR(Filtered)} primitive from the PHY layer, if the received signal strength of the received PPDU is less than the second-type (HE) CCA threshold, the MAC layer may reset CCA by issuing a PHY-CCARESET.request primitive to the PHY layer and continue channel access (S2750). If the PHY-CCARESET.request primitive is generated and transmitted to the PHY layer by the MAC layer, the PHY layer may reset a CS/CCA timer and continue the channel access operation. In this manner, even though a NAV timer has not expired, the PHY-CCARESET.request primitive may be issued according to the present disclosure.

Also, proceeding to steps S2710, S2730, S2740, S2750, and S2760 and performing no NAV update or a NAV reset in the example of FIG. 27 may correspond to proceeding to steps S2020, S2060, and S2070 and performing no NAV update in FIG. 20 or proceeding to steps S2530, S2550, and S2560 and performing a NAV reset in FIG. 25.

Upon receipt of the RXEND.indication {RXERROR(Filtered)} primitive from the PHY layer (S2730), if the received signal strength of the received PPDU is equal to or larger than the second-type (HE) CCA threshold (S2740), the MAC layer may process the PPDU received from the PHY layer, without issuing a PHY-CCARESET.request primitive to the PHY layer. Therefore, the MAC layer may operate in the same manner as proceeding to steps S2060 and S2080 and performing a NAV update in FIG. 20, or proceeding to steps S2550 and S2540 and performing a NAV update in FIG. 25 (S2720).

In an additional example, in the case where the PHY layer of the STA is capable of checking BSS identification information of a PPDU during reception of the PPDU, if the PHY layer of the STA determines that the BSS identification information (e.g., COLOR value) of the received PPDU is not identical to BSS identification information (e.g., a COLOR value) about the STA, the PHY layer of the STA may determine whether the received signal strength of the received PPDU is less than, or equal to or larger than the second-type (HE) CCA threshold, before issuing a PHY-RXSTART.indication primitive.

If the received signal strength of the received PPDU is less than the second-type (HE) CCA threshold, the PHY layer of the STA may not issue the PHY-RXSTART.indication primitive. That is, although the PHY layer has received a valid PHY header of the PPDU, the PHY layer may disregard the PPDU without transmitting the PPDU to the MAC layer (or the PHY layer may discard the PPDU). Therefore, the CCA state may be kept channel idle, not channel busy. As the PHY layer of the STA has detected the PPDU (or the valid PHY header of the PPDU) but does not issue the PHY-RXSTART.indication primitive, the PHY layer does not eventually issue the PHY-RXEND.indication primitive. As the PHY layer disregards or does not process a PPDU having BSS identification information different from the BSS identification information about the STA as described above, the PHY layer may operate in the same manner as proceeding to steps S2060 and S2070 and performing no NAV update in FIG. 20, or proceeding to step S2560 and performing a NAV reset, determining that reception of a new PPDU has not been detected in step S2520 in FIG. 25.

If the received signal strength of the received PPDU is equal to or larger than the second-type (HE) CCA threshold, the PHY layer of the STA may issue the PHY-RXSTART.indication primitive. Also, the PHY layer may transmit the PHY-RXEND.indication {RXERROR(Filtered)} primitive to the MAC layer. Therefore, the PHY layer may operate in the same manner as proceeding to steps S2020, S2060, and S2080 and perform a NAV update in FIG. 20 or proceeding to steps S2530, S2550, and S2540 and perform a NAV update in FIG. 25.

Hereinbelow, a description will be given of exemplary channel access operations in the case of dynamic CCA according to the present disclosure. These channel access operations include exemplary backoff procedures according to the present disclosure.

As described before with reference to FIG. 27, if the STA determines based on the PHY header (e.g., HE-SIG-A or HE-SIG-B) or MAC header (e.g., RA or TA) of a PPDU during reception of the PPDU that the PPDU does not match the BSS identification information about the STA (S2710 and S2730 in FIG. 27), and the received signal strength of the PPDU is less than the second-type (HE) CCA threshold, the STA may set the CCA state to the channel idle state (steps S2740 and S2705 in FIG. 27). Then, the STA may continue channel access in the channel idle state. Now, a description will be given of examples of this channel access operation according to the present disclosure.

For example, since the case where the PHY-CCARESET.request primitive is issued and thus the CCA state is set to the channel idle state as in step S2750 in FIG. 27 corresponds to setting the CCA state to the channel busy state along with detection of a PPDU and then changing the CCA state to the channel idle state, it may be determined whether the channel is idle during a predetermined IFS interval before starting frame transmission, and when needed, a backoff procedure may be performed (or resumed).

First of all, the STA may operate according to EDCA in contending for acquiring a TXOP. One of the logical functions of the STA, EDCA Function (EDCAF) may determine by EDCA whether a frame corresponding to a specific AC is allowed to be transmitted on a wireless medium. Also, there may exist one EDCAF per AC.

Each channel access timer may keep a backoff timer having a value measured in a backoff slot. In the following description, the duration of AIFS[AC] corresponds to a duration derived from AIFSN[AC]. That is, AIFS[AC]=AIFSN[AC]×aSlotTime+aSIFSTime where AIFSN(AIFS Number) represents the number of slots.

If the EDCAF determines to initiate transmission of a frame exchange sequence, an EDCA TXOP is granted to the EDCAF. An operation of the EDCAF is performed at slot boundaries. The slot boundaries on a primary channel are defined for each EDCAF according to the following a), b), c), d), e), and f).

a) The medium is idle during AIFSN[AC]×aSlotTime−aRxTxTurnaroundTime an SIFS (the medium does not need to be necessarily idle during the SIFS) after the medium is busy on an antenna as a result of receiving the latest frame having a right FCS.

b) After the medium is indicated as busy by physical carrier sensing as a result of receiving the latest frame having an FCS error or a latest PHY-RXEND.indication (RXERROR) primitive with RXERROR set to a value other than NoError is indicated, the medium is idle during EIFS−DIFS+AIFSN[AC]×aSlotTime+aSIFSTime−aRxTxTurnaroundTime.

c) If any other EDCAF of the STA transmits a frame requiring an ACK, the earlier between 1) and 2):

1) an ACKTimeout interval ends from a PHY-TXEND.confirm primitive and the medium is idle during AIFSN[AC]×aSlotTime+aSIFSTime−aRxTxTurnaroundTime; and 2) upon generation of a PHY-RXEND.indication primitive, the idle state of the medium, which is kept during AIFSN[AC]×aSlotTime−aRxTxTurnaroundTime, ends for the first time an SIFS later (herein, the medium does not need to be necessarily idle during the SIFS, and the start of the SIFS is determined by the length of the PHY header of a previous frame).

d) The medium is idle during AIFSN[AC]×aSlotTime−aRxTxTurnaroundTime an SIFS (herein, the medium does not need to be necessarily idle during the SIFS) after the medium is busy on an antenna as a result of transmitting a frame that does not require an ACK for any latest EDCAF.

e) None of a) to d) and the medium is idle during AIFSN[AC]×aSlotTime+aSIFSTime−aRxTxTurnaroundTime after the medium is indicated as idle by the latest carrier sensing.

f) The medium is idle during aSlotTime shortly after the EDCAF satisfies any of the conditions a) to f).

At the slot boundaries, each EDCAF may determine to perform only one of starting transmission of a frame exchange sequence, decrementing a backoff timer, performing a backoff procedure due to internal collision, and doing nothing.

As described before in relation to step S2750 of FIG. 27, if a PPDU received at the STA is filtered out, the PHY of the STA may issue a PHY-RXEND.indication{RXERROR(Filtered)} primitive to the MAC layer.

Further, according to the EDCA mechanism (refer to the description of FIG. 4), it is to be confirmed that the channel is idle during a predetermined IFS interval in order to resume a backoff procedure after the CCA state is changed from the channel busy state to the channel idle state.

Also according to the EDCA mechanism (refer to condition b) among the definitions of slot boundaries), if the RXERROR parameter returns a value other than NoError in the PHY-RXEND.indication primitive, the backoff procedure may be resumed always after it is confirmed that the channel is idle during a time period corresponding to EIFS−DIFS+AIFSN[AC]×aSlotTime+aSIFSTime−aRxTxTurnaroundTime.

Herein, it is defined that EIFS=aSIFSTime+EstimatedACKTxTime+DIFS. EstimatedACKTxTime may be based on an estimated duration of a PPDU that may be transmitted in response to a PPDU causing an EIFS.

After a frame for which a PHY-RXEND.indication primitive including an error is reported is received or a frame with a wrong MAC FCS value is received, a DCF uses an Extended IFS (EIFS) to determine whether the medium is idle, before transmission. Similarly, the EDCA mechanism based on a Hybrid Coordination Function (HCF) may use an interval of EIFS−DIFS+AIFS[AC]. The EIFS or EIFS−DIFS+AIFS[AC] interval starts after the PHY detects an erroneous frame and then the medium is indicated as idle, irrespective of a virtual carrier sensing mechanism. The STA does not start transmission before expiration of the later between a NAV and an EIFS or EIFS−DIFS+AIFS[AC]. The EIFS or EIFS−DIFS+AIFS[AC] is defined to provide a time sufficient for another STA to transmit an ACK for a frame. That is, it may be said that the STA using the EIFS or EIFS−DIFS+AIFS[AC] waits for a time enough for another STA to transmit an ACK before the STA starts transmission because the STA has received a wrong frame directed to the other STA. Upon receipt of an error-free frame during the EIFS or EIFS−DIFS+AIFS[AC], the medium is resynchronized in an actual busy or idle state and thus the EIFS or EIFS−DIFS+AIFS[AC] is terminated. After receiving the frame, the STA may resume medium access (using an appropriate one between a DIFS and an AIFS and when needed, by performing backoff). If the EIFS or EIFS−DIFS+AIFS[AC] expires or is terminated, the STA may control medium access by returning to a NAV and physical carrier sensing.

That is, while an STA receives an erroneous frame during channel access and then is to continue the channel access, another STA may transmit a control response frame for the PPDU that the STA has failed to receive successfully. Thus to protect transmission of the other STA, a predetermined IFS may be used. Specifically, the predetermined IFS may be an EIFS value in a DCF channel access operation and an EIFS−DIFS+AIFS[AC] value in an EDCA channel access operation. Although an EDCA channel access operation is described for the simplicity of description, the same thing also applies to DCF channel access. That is, EIFS−DIFS+AIFS[AC] as the predetermined IFS value in the EDCA channel access operation may be replaced with an EIFS as the predetermined IFS value in the DCF channel access operation.

Figure 28:
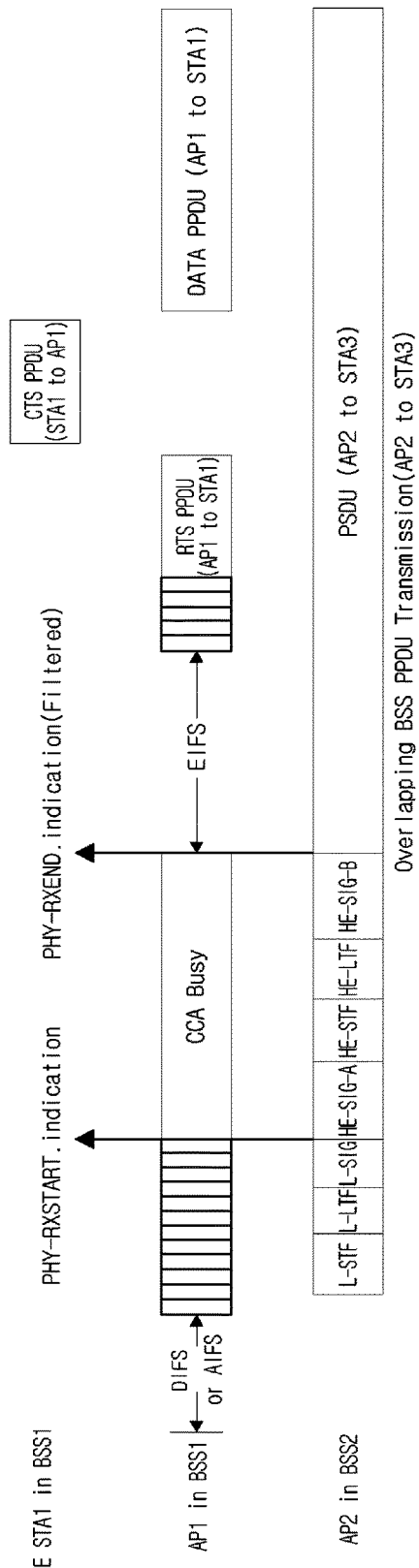
FIG. 28 depicts an exemplary channel access operation in the case of dynamic CCA according to the present disclosure.

FIG. 28 depicts an exemplary channel access operation in the case of dynamic CCA according to the present disclosure.

The example of FIG. 28 illustrates that to transmit DATA to STA1 belong to the same BSS, AP1 belonging to BSS1 confirms that a channel is idle during a DIFS or AIFS and starts a backoff procedure. It is assumed that while AP1 is counting down a backoff timer, AP2 and STA3 which belong to another BSS neighboring to BSS1, BSS2 communicate with each other.

If AP1, which overhears a PPDU directed from AP2 to STA3, receives a valid legacy preamble (L-STF, L-LTF, and L-SIG) of the PHY header of the PPDU, AP1 may issue a PHY-RXSTART.indication primitive to the MAC layer and set a CCA state to the channel busy state. For example, upon receipt of a PPDU, if the received signal strength of the legacy preamble of the PPDU is equal to or larger than a first-type (legacy) CCA threshold, AP1 may issue a PHY-CCA.indication(BUSY) primitive and a PHY-RXSTART.indication primitive (refer to steps S2704 and S2708 in FIG. 27). Herein, AP1 which has received up to the legacy preamble of the PPDU may not determine the transmitter and BSS identification information of the PPDU yet.

Then, if the PHY header (e.g., HE-SIG-A or HE-SIG-B) of a PPDU transmitted from AP2 includes BSS identification information (e.g., a COLOR field), AP1 may compare the value of the COLOR field included in the received PPDU with a COLOR value of the BSS to which AP1 belongs. The value of the COLOR field of the PPDU received at AP1 may indicate BSS2 to which AP2 belongs, different from BSS1 to which AP1 belongs. Thus, AP1 may confirm that the current received PPDU has been transmitted from an AP/STA belonging to a different BSS (refer to step S2710 in FIG. 27). For example, while it is assumed that a COLOR field is included in a HE-SIG-B in the example of FIG. 28, the scope of the present disclosure is not limited thereto, and the COLOR field may be included in a HE-SIG-A. If AP1 determines that the current received PPDU has been transmitted from a different BSS, AP1 may issue a PHY-RX-END.indication primitive with an RXERROR parameter set to Filtered to the MAC layer (refer to step S2730 in FIG. 27).

In this case, AP1 may compare the received signal strength of the current received PPDU with a second-type (HE) CCA threshold. If the received signal strength of the current received PPDU is less than the second-type (HE) CCA threshold, AP1 may continue the channel access operation by changing the CCA state to the channel idle state again. For this purpose, AP1 may issue a PHY-CCARESET.request primitive (refer to step S2750 in FIG. 27).

Or in the case where the current PPDU received by AP1 has been transmitted from a different BSS, the condition of issuing a PHY-RXEND.indication primitive with an RXERROR parameter set to Filtered may be restricted to the case in which the received signal strength of the current received PPDU is less than the second-type (HE) CCA threshold. In this case, if the received signal strength of the current received PPDU is less than the second-type (HE) CCA threshold, the PHY layer of AP1 issues a PHY-RXEND.indication primitive with an RXERROR parameter set to Filtered to the MAC layer of AP1, and the MAC layer issues a PHY-CCARESET.request primitive to the PHY layer. Thus, the CCA state may be changed to the channel idle state again.

If the CCA state is switched from the channel busy state to the channel idle state, AP1 may determine whether the channel is idle during a predetermined IFS to resume the backoff procedure. In the case of an EDCA channel access operation, AP1 may resume the backoff procedure after determining whether the channel is idle during an EIFS interval, as illustrated in FIG. 28.

The EIFS illustrated in FIG. 28 means a time period over which it is confirmed that the channel is idle before an AP or STA resumes the backoff procedure, when the AP or STA changes the CCA state to the channel busy state upon detection of a PPDU during the backoff procedure in the channel idle state, issues a PHY-RXEND.indication{RXERROR(Filtered)} primitive by confirming that the PPDU does not match BSS identification information about the AP or STA, and issues a PHY-CCARESET.request primitive to set the CCA state to the channel idle state based on a second-type (HE) CCA threshold.

Specifically, since the example of FIG. 28 corresponds to a case in which a PHY-RXEND.indication primitive with an RXERROR parameter set to a value other than NoError (i.e., Filtered) is issued, the backoff procedure may be resumed after it is confirmed that the channel is idle during a time period corresponding to EIFS−DIFS+AIFSN[AC]×aSlotTime+aSIFSTime−aRxTxTurnaroundTime (i.e., EIFS−DIFS+AIFS[AC] or EIFS).

Meanwhile, considering that dynamic CCA is meant to increase a spatial reuse gain between BSSs, protection of frame transmission from another STA may not be taken into in a channel access operation for the case where transmission from a different BS is confirmed, compared to a channel access operation for protecting transmission of a response frame from another STA within the same BSS. That is, if it is determined that a PPDU has been transmitted from a different BSS and thus the CCA state is switched from the channel busy state to the channel idle state as in the example of FIG. 28, checking the channel idle state during an EIFS interval may cause unnecessary protocol overhead. Now, examples of a channel access operation for increasing the performance of dynamic CCS by reducing the protocol overhead according to the present disclosure will be described below.

Figure 29:
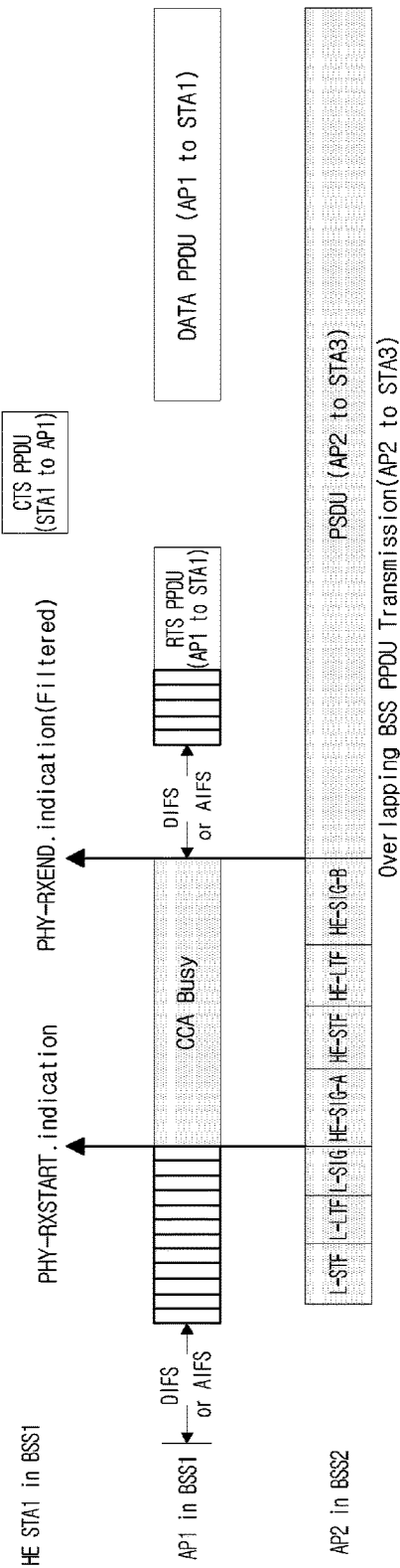
FIG. 29 depicts another exemplary channel access operation in the case of dynamic CCA according to the present disclosure.

FIG. 29 depicts another exemplary channel access operation in the case of dynamic CCA according to the present disclosure.

In the example of FIG. 29, upon detection of a PPDU during a backoff procedure in the channel state, AP1 issues a PHY-RXSTART.indication primitive, sets the CCA state to the channel busy state (based on a first-type (legacy) CCA threshold), issues a PHY-RXEND.indication primitive by determining that the PPDU does not match BSS identification information about AP1, and issues a PHY-CCARESET.request primitive to set the CCA state to the channel idle state based on a second-type (HE) CCA threshold, in the same manner as in the example of FIG. 28, and these operations will not be described herein in detail in order to avoid redundancy.

In the example of FIG. 29, although the RXERROR parameter of the PHY-RXEND.indication primitive is set to not NoError but Filtered, if the cause of Filtered is different BSS identification information (e.g., different COLOR information), AP1 may resume the backoff procedure after the PHY-RXEND.indication primitive is indicated and AP1 determines whether the channel is idle for a DIFS or AIFS interval.

The DIFS or AIFS illustrated in FIG. 29 means a time period over which it is confirmed that the channel is idle before an AP or STA resumes the backoff procedure, when the AP or STA changes the CCA state to the channel busy state upon detection of a PPDU during the backoff procedure in the channel idle state, issues a PHY-RXEND.indication primitive by confirming that the PPDU does not match BSS identification information about the AP or STA, and issues a PHY-CCARESET.request primitive to set the CCA state to the channel idle state based on a second-type (HE) CCA threshold. The DIFS or AIFS is a shorter IFS than the EIFS illustrated in FIG. 28.

Specifically, in the example of FIG. 29, even though a PHY-RXEND.indication primitive with an RXERROR parameter set to a value other than NoError (i.e., Filtered), if the cause of Filtered is different BSS identification information (e.g., different COLOR information), AP1 may confirm that the channel is idle for a time period corresponding to AIFSN[AC]×aSlotTime−aRxTxTurnaroundTime (i.e., AIFS[AC]) an SIFS interval after the PHY-RXEND.indication primitive is indicated, and then resume the backoff procedure.

In another example, if the CCA state is changed to the channel busy state along with detection of a PPDU during the backoff procedure in the channel idle state at an AP or STA, the AP or STA determines that the PPDU does not match BSS identification information about the AP or STA, and the received signal strength of the received PPDU is less than a second-type (HE) CCA threshold, the PHY layer may set the RXERROR parameter not to Filtered but to NoError in issuing a PHY-RXEND.indication primitive to the MAC layer. As in the example of FIG. 29, therefore, as the PHY layer issues a PHY-RXEND.indication primitive with NoError rather than the RXERROR parameter is set to Filtered in the PHY-RXEND.indication primitive and a different IFS value is determined for backoff resumption according to the cause of Filtered, the time period over which the AP or STA confirms that the channel is idle to resume the backoff procedure may be eventually set to an AIFS or DIFS.

In an additional example, if BSS identification information of a PPDU detected during the backoff procedure in the channel idle state at an AP or STA is different from BSS identification information about the AP or STA, and the received signal strength of the received PPDU is less than a second-type (HE) CCA threshold, the AP or STA may not issue a PHY-RXSTART.indication primitive. As a result, the AP or STA may not issue a PHY-RXEND.indication primitive, either. That is, although the PHY layer has received a valid PHY header of the PPDU, the PHY layer may disregard the PPDU without transmitting the PPDU to the MAC layer (or the PHY may discard the PPDU). As a consequence, the CCA state may be kept as the channel idle state, not the channel busy state.

If the AP or STA determines that the received PPDU has been transmitted from the same BSS or if the AP or STA determines that the received PPDU has been transmitted from a different BSS but the received signal strength of the PPDU is equal to or larger than the second-type (HE) CCA threshold, the AP or STA may issue a PHY-RXSTART.indication primitive and set the CCA state to the channel busy state. In this case, the AP or STA may determine whether to set the RXERROR parameter of the PHY-RXSTART.indication primitive to Filtered depending on whether a GROUP_ID or PARTIAL_AID filtering condition for the PPDU is satisfied, and this PHY-RXEND.indication primitive may be issued after GROUP_ID or PARTIAL_AID is checked.

According to the foregoing examples of the present disclosure, if an STA detects a PPDU and determines that the PPDU does not match BSS identification information about the STA, and the received signal strength of the PPDU is less than a second-type (HE) CCA threshold, the STA may terminate reception of the PPDU. In performing channel access after the termination of the PPDU reception, the STA may confirm that the channel is idle using an EIFS, or a DIFS or AIFS.

Now, a description will be given of a NAV reset operation based on a CF-END frame as another example of the NAV reset operation based on BSS identification information.

As described before with reference to FIG. 25, an STA may disregard an RTS/CTS frame exchange that takes place in a different BSS (e.g., steps S2530, (S2550) and S2560 in FIG. 25). That is, if the STA fails to receive a new PPDU generated within the same BSS during a predetermined time period after receiving an RTS frame and setting a NAV (i.e., this corresponds to a case in which the STA fails to receive a new PPDU generated within the same BSS because it disregards a PPDU generated from a different BSS), the STA may reset the NAV.

While the NAV reset may be performed in the case of non-PPDU reception as described above, the NAV reset may be performed even though a specific PPDU is received. For example, if the STA receives a PPDU including a CF-END frame, the STA may reset a NAV.

In this case, only when the STA receives a CF-END frame having BSS identification information identical to the BSS identification information about the STA, the STA may reset a NAV timer at the ending time of the CF-END frame according to the present disclosure. In other words, even though the STA receives a CF-END frame transmitted from a different BSS, the STA may not reset its NAV.

That is, if the STA receives a PPDU having BSS identification information identical to the BSS identification information about the STA, the STA may set or update its NAV as described with reference to FIG. 20 or the like, and may not reset the set NAV even though it receives a CF-END frame from a different BSS.

A description will be given below of a NAV setting operation in the case where an exchange between a UL MU trigger frame (e.g., a UL MU-MIMO/OFDMA Poll frame) and a UL MU frame.

As described before with reference to FIG. 20, upon receipt of a PPDU generated from a different BSS, an STA may not perform a NAV update, disregarding the PPDU (e.g., steps S2020, (S2060) and S2070 in FIG. 20). Likewise, only when an exchange between a UL MU trigger frame and a UL MU frame occurs in the same BSS, the STA may set its NAV. That is, the STA may disregard an exchange between a UL MU trigger frame and a UL MU frame that occurs in a different BSS.

Meanwhile, if a UL MU trigger frame received at the STA includes identification information about the STA (e.g., the AID of the STA) in a UL MU TA (i.e., information indicating an STA to perform a UL MU transmission or information indicating an STA to which resources are allocated for a UL MU transmission), and the TA of the UL MU trigger frame matches the BSSID of a BSS with which the STA has been associated, the STA may transmit a UL MU frame in MU-MIMO/OFDMA, an SIFS after receiving the UL MU trigger frame. Herein, the STA may neither consider its NAV nor reset its NAV. That is, upon receipt of a UL MU trigger frame having BSS identification information identical to BSS identification information about the STA, the STA may set or update its NAV as described with reference to FIG. 20 or the like, and when transmitting a UL MU frame in response to the UL MU trigger frame, the STA may perform a UL MU transmission without giving regard to an existing set NAV (e.g., a NAV set by a frame triggering UL MU transmission, transmitted by an AP).

While the afore-described exemplary methods of present invention have been described as a series of operations for simplicity of description, this does not limit the sequence of steps. When needed, steps may be performed at the same time or in a different sequence. All of the exemplary steps are not always necessary to implement the method proposed by the present invention.

The foregoing embodiments of the present invention may be implemented separately or combinations of two or more of the embodiments may be implemented simultaneously, for the afore-described exemplary methods of present invention.

The present invention includes an apparatus for processing or performing the method of the present invention (e.g., the wireless device and its components described with reference to FIGS. 1, 2, and 3).

The present invention includes software (an operating system (OS), an application, firmware, a program, etc.) for executing the method of the present invention in a device or a computer, and a medium storing the software that can be executed in a device or a computer.

While various embodiments of the present invention have been described in the context of an IEEE 802.11 system, they are applicable to various mobile communication systems.

The invention claimed is:

1. A method for processing a first Physical layer Protocol Data Unit (PPDU) by a station (STA) in a wireless local area network, the method comprising:
 determining, using BSS identification information included in a Signal A field of the first PPDU, whether the first PPDU is transmitted from a different Basic Service Set (BSS) from a BSS to which the STA belongs or a same BSS as the BSS to which the STA belongs; and
 processing the first PPDU,
 wherein processing the first PPDU comprises:
  processing the first PPDU using a first type of Clear Channel Assessment (CCA) threshold when the first PPDU is determined to be transmitted from the different BSS; and
  processing the first PPDU using a second type of CCA threshold when the first PPDU is determined to be transmitted from the same BSS,
 wherein the first type of CCA threshold is greater than the second type of CCA threshold.

2. The method according to claim 1,
 wherein the determining is based on whether the BSS identification information included in the first PPDU matches BSS identification information of the STA.

3. The method according to claim 2, further comprising:
 determining that the first PPDU is transmitted by the different BSS when the BSS identification information included in the first PPDU does not match the BSS identification information of the STA.

4. The method according to claim 3, further comprising:
 determining that the first PPDU is transmitted by the same BSS when the BSS identification information included in the first PPDU matches the BSS identification information of the STA.

5. The method according to claim 1,
 wherein the Signal A field is a High Efficiency-SIGNAL-A (HE-SIG-A) field.

6. The method according to claim 5,
 wherein the BSS identification information is a BSS COLOR information.

7. The method according to claim 1, further comprising:
 detecting the first PPDU.

8. The method according to claim 1, wherein processing the first PPDU comprises:
 determining whether a signal strength of the first PPDU is lower than the first type of CCA threshold, and
 resetting a CCA process when the first PPDU is determined to be transmitted from the different BSS and when the signal strength of the first PPDU is lower than the first type of CCA threshold.

9. The method according to claim 1, wherein processing the first PPDU comprises:
 attempting to acquiring a channel access opportunity based on the first type of CCA threshold,
 determining a destination station among stations supporting the first type of CCA threshold when the channel access opportunity is acquired based on the first type of CCA threshold,
 transmitting a second PPDU to the destination station.

10. The method according to claim 1, wherein processing the first PPDU comprises:
 determining whether to reset a Network Allocation Vector (NAV) based on whether the first PPDU is transmitted from the different BSS or the same BSS, when the first PPDU includes a Contention Free-END (CF-END) frame.

11. The method according to claim 10, further comprising:
resetting, by the STA, the NAV when the first PPDU includes the CF-END frame and is determined to be transmitted from the same BSS.

12. The method according to claim 11, further comprising:
determining, by the STA, to not reset the NAV when the first PPDU includes the CF-END frame and is determined to be transmitted from the different BSS.

13. The method according to claim 12, further comprising:
updating, by the STA, the NAV before detecting the first PPDU.

14. The method according to claim 13,
wherein the NAV is updated based on a PPDU transmitted from the same BSS.

15. An apparatus for facilitating wireless communication, the apparatus comprising:
one or more memories; and
one or more processors coupled to the one or more memories, the one or more processors configured to cause:
determining, using BSS identification information included in a High Efficiency Signal A (HE-SIG-A) field of a first Physical layer Protocol Data Unit (PPDU), whether the first PPDU is transmitted from a different Basic Service Set (BSS) from a BSS to which the STA belongs or a same BSS as the BSS to which the STA belongs; and
processing the first PPDU,
wherein processing the first PPDU comprises:
processing the first PPDU using a first type of Clear Channel Assessment (CCA) threshold when the first PPDU is determined to be transmitted from the different BSS, and
processing the first PPDU using a second type of CCA threshold when the first PPDU is determined to be transmitted from the same BSS,
wherein the first type of CCA threshold is greater than a second type of CCA threshold.

16. The apparatus according to claim 15, wherein processing the first PPDU comprises:
determining whether a signal strength of the first PPDU is lower than the first type of CCA threshold, and
resetting a CCA process when the first PPDU is determined to be transmitted from the different BSS and the signal strength of the first PPDU is lower than the first type of CCA threshold.

17. The apparatus according to claim 15, wherein processing the first PPDU comprises:
attempting to acquiring a channel access opportunity based on the first type of CCA threshold,
determining a destination station among stations supporting the first type of CCA threshold when the channel access opportunity is acquired based on the first type of CCA threshold,
transmitting a second PPDU to the destination station.

18. The apparatus according to claim 15, wherein processing the first PPDU further comprises:
determining whether to reset a Network Allocation Vector (NAV) based on whether the first PPDU is transmitted from the different BSS or the same BSS, when the first PPDU includes a Contention Free-END (CF-END) frame.

* * * * *